United States Patent
Saihara

(10) Patent No.: US 10,449,823 B2
(45) Date of Patent: Oct. 22, 2019

(54) STABILIZER BUSH

(71) Applicant: TOYO TIRE & RUBBER CO., LTD., Itami-shi, Hyogo (JP)

(72) Inventor: Yoshiyuki Saihara, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 45 days.

(21) Appl. No.: 15/800,295

(22) Filed: Nov. 1, 2017

(65) Prior Publication Data

US 2018/0134110 A1    May 17, 2018

(30) Foreign Application Priority Data

Nov. 16, 2016    (JP) .................................. 2016-222970

(51) Int. Cl.
*B60G 21/055*    (2006.01)
*F16F 1/38*    (2006.01)
(Continued)

(52) U.S. Cl.
CPC .......... *B60G 21/0551* (2013.01); *B29C 65/02* (2013.01); *B29C 65/4835* (2013.01);
(Continued)

(58) Field of Classification Search
CPC ........ B60G 21/0551; B60G 2204/1222; B60G 2204/41; B60G 2206/73; B60G 2206/821;
(Continued)

(56) References Cited

U.S. PATENT DOCUMENTS 8,424,891 B2 *  4/2013  Nagai ...................... F16F 1/16
                                                    280/124.107
8,454,774 B2    6/2013  Grundmeier
                        (Continued)

FOREIGN PATENT DOCUMENTS

CN    101090834 A    12/2007
DE       2160022 A1     6/1973
(Continued)

OTHER PUBLICATIONS

Related co-pending application: U.S. Appl. No. 15/800,279, filed Nov. 1, 2017, counterpart of Japanese Patent Application No. 2016-222969.
(Continued)

*Primary Examiner* — Laura Freedman
(74) *Attorney, Agent, or Firm* — Westerman, Hattori, Daniels & Adrian, LLP

(57) ABSTRACT

A bush main body having a circumferential part divided by a first virtual plane includes a first portion that is extended over a predetermined circumferential distance from the first virtual plane, a second portion that is disposed opposite the first portion with the first virtual plane sandwiched in between and is extended over a predetermined circumferential distance from the first virtual plane, and a third portion that is a portion other than the first and second portions. The inside diameter of the inner peripheral surface in a second virtual plane that includes an axial center and is perpendicular to the first virtual plane is set to be greater than the inside diameter of the inner peripheral surface in the first virtual plane while the first portion is in contact with the second portion in a no-load state before bonding to the stabilizer bar.

11 Claims, 11 Drawing Sheets

(51) Int. Cl.
  *B29C 65/48* (2006.01)
  *B29C 65/02* (2006.01)
  *B29C 65/00* (2006.01)
  *B29L 31/00* (2006.01)
  *B29L 31/30* (2006.01)

(52) U.S. Cl.
  CPC ...... *B29C 66/1122* (2013.01); *B29C 66/1142* (2013.01); *B29C 66/532* (2013.01); *B29C 66/53241* (2013.01); *B29C 66/543* (2013.01); *B29C 66/71* (2013.01); *B29C 66/742* (2013.01); *F16F 1/3842* (2013.01); *B29L 2031/30* (2013.01); *B29L 2031/721* (2013.01); *B60G 2204/1222* (2013.01); *B60G 2204/41* (2013.01); *B60G 2206/73* (2013.01); *B60G 2206/821* (2013.01)

(58) Field of Classification Search
  CPC ............ B29C 66/1122; B29C 66/1142; B29C 66/532; B29C 66/53241; B29C 66/543; B29C 66/71; B29C 66/742; B29C 65/02; B29C 65/4835; F16F 1/3842; B29L 2031/30; B29L 2031/721
  See application file for complete search history.

(56) References Cited

U.S. PATENT DOCUMENTS

| | | | | |
|---|---|---|---|---|
| 9,636,966 | B2* | 5/2017 | Imazu | B60G 21/0551 |
| 9,981,524 | B2 | 5/2018 | Matsumura et al. | |
| 10,052,929 | B2* | 8/2018 | Kuroda | B60G 21/055 |
| 2006/0091595 | A1* | 5/2006 | Hayashi | B60G 21/0551 |
| | | | | 267/276 |
| 2006/0125165 | A1 | 6/2006 | Niwa et al. | |
| 2008/0244861 | A1* | 10/2008 | Miyamoto | B60G 21/0551 |
| | | | | 16/2.1 |
| 2010/0001448 | A1* | 1/2010 | Miyamoto | B60G 21/0551 |
| | | | | 267/276 |
| 2017/0080772 | A1 | 3/2017 | Matsumura et al. | |
| 2018/0134109 | A1* | 5/2018 | Saihara | F16F 1/3842 |
| 2018/0134110 | A1 | 5/2018 | Saihara | |
| 2018/0141402 | A1* | 5/2018 | Oh | B60G 21/0551 |
| 2018/0172101 | A1 | 6/2018 | Kume et al. | |

FOREIGN PATENT DOCUMENTS

| | | | | |
|---|---|---|---|---|
| DE | 102016010313 | A1 | 3/2017 | |
| EP | 0 384 799 | B1 | 4/1992 | |
| JP | 3-158729 | A | 7/1991 | |
| JP | 09177853 | A * | 7/1997 | |
| JP | 10138725 | A | 5/1998 | |
| JP | 2005254936 | A * | 9/2005 | |
| JP | 2006-290313 | A | 10/2006 | |
| JP | 2007050777 | A * | 3/2007 | |
| JP | 2007-161146 | A | 6/2007 | |
| JP | 2007203756 | A * | 8/2007 | ......... B60G 21/0551 |
| JP | 2007253737 | A * | 10/2007 | |
| JP | 2012-072794 | A | 4/2012 | |
| JP | 2012197056 | A * | 10/2012 | |
| JP | 2018079783 | A * | 5/2018 | ............ F16F 1/3842 |

OTHER PUBLICATIONS

Extended European Search Report dated Apr. 26, 2018, issued in counterpart European Application No. 17199876.8. (9 pages).
Extended European Search Report dated Apr. 26, 2018, issued in counterpart European Application No. 17199859.4. (5 pages).
Office Action dated Mar. 4, 2019, issued in counterpart CN Application No. 201710948070.3, with English translation (13 pages).
Non-Final Office Action dated Jun. 27, 2019, issued in counterpart U.S. Appl. No. 15/800,279 (19 pages).
Office Action dated Mar. 4, 2019, issued in counterpart CN Application No. 201710947572.4, with English translation (14 pages).

* cited by examiner

STABILIZER BUSH

TECHNICAL FIELD

The present invention relates to a stabilizer bush, and more particularly, to a stabilizer bush capable of providing improved adhesion durability relative to a stabilizer bar.

BACKGROUND ART

A stabilizer bush elastically supports a stabilizer bar with respect to a vehicle body by using a bush main body formed of a cylindrical rubber elastic body. The stabilizer bush may be obtained by applying an adhesive to bond the outer peripheral surface of the stabilizer bar to the inner peripheral surface of the bush main body, which is circumferentially divided in a predetermined division plane (Patent Literature 1).

A technology disclosed in Patent Literature 1 bonds the bush main body to the stabilizer bar. Therefore, when load oriented in the prying direction is applied from the stabilizer bar to the bush main body, the bush main body is not only compressively defamed but also tensile-deformed. When the bush main body is pre-compressed in the radial direction, an adhesive layer between the bush main body and the stabilizer bar is unlikely to generate a tensile force during tensile defamation. Consequently, the bush main body is unlikely to peel off from the stabilizer bar. This provides adequate adhesion durability between the bush main body and the stabilizer bar.

CITATION LIST

Patent Literature

[Patent Literature 1] JP-A No. 2006-290313

SUMMARY OF INVENTION

Technical Problem

However, when the above-described conventional technology is used, the vicinity of the division plane of the bush main body is likely to serve as a start point at which the bush main body peels off from the stabilizer bar. Therefore, it is demanded that the above-described conventional technology be improved to provide enhanced adhesion durability between the bush main body and the stabilizer bar by increasing the amount of pre-compression applied to the vicinity of the division plane of the bush main body.

The present invention has been made to meet the above-described demand. An object of the present invention is to provide a stabilizer bush that is capable of improving the adhesion durability relative to a stabilizer bar.

Solution to Problem

In order to accomplish the above object, a stabilizer bush according to the present invention includes a bush main body formed of a cylindrical rubber elastic body, and is configured so that the inner peripheral surface of the bush main body is bonded to the outer peripheral surface of a stabilizer bar while the bush main body is pre-compressed in the radial direction. A circumferential part of the bush main body is divided by a first virtual plane. The bush main body includes a first portion, a second portion, and a third portion. The first portion is extended over a predetermined circumferential distance from the first virtual plane. The second portion is disposed opposite the first portion with the first virtual plane sandwiched in between, and is extended over a predetermined circumferential distance from the first virtual plane. The third portion is a portion other than the first and second portions. The inside diameter of the inner peripheral surface in a second virtual plane that includes an axial center and is perpendicular to the first virtual plane is set to be greater than the inside diameter of the inner peripheral surface in the first virtual plane while the first portion is in contact with the second portion in a no-load state before the bush main body is bonded to the stabilizer bar.

Advantageous Effects of Invention

According to the stabilizer bush described in a first aspect of the present invention, the inside diameter of the inner peripheral surface of the bush main body in the second virtual plane is set to be greater than the inside diameter of the inner peripheral surface of the bush main body in the first virtual plane while the first portion is in contact with the second portion in a no-load state of the bush main body before it is bonded to the stabilizer bar. This increases the amount of radial pre-compression on the vicinity of the first virtual plane of the bush main body when the inner peripheral surface of the bush main body is to be bonded to the outer peripheral surface of the stabilizer bar in a state where the bush main body is pre-compressed in the radial direction. Then, at the time of load input, the tensile force is unlikely to be applied to the adhesive layer for bonding the bush main body to the stabilizer bar. This results in improvement of the adhesion durability relative to the stabilizer bar.

According to the stabilizer bush described in a second aspect of the present invention, the first portion includes a leading end portion, an inner surface portion, and an outer surface portion. The inner surface portion places the third portion in communication with the radial inside of the leading end portion, and is tilted with respect to the first virtual plane. The outer surface portion places the third portion in communication with the radial outside of the leading end portion, and is tilted with respect to the first virtual plane. The leading end portion comes into contact with the second portion when the first and second portions are in contact with each other in a no-load state of the bush main body before it is bonded to the stabilizer bar. Thus, the leading end portion is pushed by the second portion when the inner peripheral surface of the bush main body is to be bonded to the outer peripheral surface of the stabilizer bar in a state where the bush main body is pre-compressed in the radial direction. This radially deforms the first portion along the inner and outer surface portions, and radially deforms a portion of the third portion that is contiguous to the inner and outer surface portions. This increases the amount of radial pre-compression on the vicinity of the first virtual plane of the bush main body. Consequently, in addition to the advantageous effect of the first aspect, the adhesion durability relative to the stabilizer bar can be improved.

According to the stabilizer bush described in a third aspect of the present invention, the radial center of the leading end portion is positioned radially inward from the radial center of the boundary between the first and third portions. As the leading end portion, which receives load from the opposing second portion, is positioned radially inward, the load is intensively applied to the vicinity of the boundary between the first and third portions. This increases the amount of radial pre-compression on the vicinity of the first virtual plane of the bush main body. Consequently, in addition to the advantageous effects of the second aspect, the adhesion durability relative to the stabilizer bar can be further improved.

According to the stabilizer bush described in a fourth aspect of the present invention, the radial dimension of the outer surface portion is set to be greater than the radial dimension of the inner surface portion. Thus, the load that the leading end portion receives from the opposing second portion is supported to a greater extent by the outer surface portion than by the inner surface portion. Therefore, the vicinity of the first virtual plane of the bush main body is likely to deform radially inward. This increases the amount of radial pre-compression on the vicinity of the first virtual plane of the bush main body. Consequently, in addition to the advantageous effects of the second aspect, the adhesion durability relative to the stabilizer bar can be further improved.

According to the stabilizer bush described in a fifth aspect of the present invention, the outer surface portion is contiguous to the outer peripheral surface of the third portion. This properly provides the radial dimension of the outer surface portion. Thus, the load that the leading end portion receives from the opposing second portion is easily supported by the outer surface portion. Therefore, the first portion is unlikely to deform radially outward and likely to deform radially inward. This increases the amount of radial pre-compression on the vicinity of the first virtual plane of the bush main body. Consequently, in addition to the advantageous effects of the second aspect, the adhesion durability relative to the stabilizer bar can be further improved.

According to the stabilizer bush described in a sixth aspect of the present invention, the outer peripheral surface of the third portion includes a contact target portion and a restricting portion. The contact target portion is disposed at the axial center. The restricting portion is disposed on each axial end of the contact target portion and projected radially outward with respect to the contact target portion. As the outer surface portion is contiguous to the contact target portion and to the restricting portion, the radial dimension of the outer surface portion is increased. Thus, the load that the leading end receives from the opposing second portion is easily supported by the outer surface portion. This further increases the amount of radial pre-compression on the vicinity of the first virtual plane of the bush main body. Consequently, in addition to the advantageous effects of the fifth aspect, the adhesion durability relative to the stabilizer bar can be further improved.

According to the stabilizer bush described in a seventh aspect of the present invention, the outer peripheral surface of the third portion includes a contact target portion and a restricting portion. The contact target portion is disposed at the axial center. The restricting portion is disposed on each axial end of the contact target portion and projected radially outward with respect to the contact target portion. When the outer surface portion is contiguous to the contact target portion and to the restricting portion, a part of the first portion needs to be concaved radially inward. However, the outer surface portion is contiguous to the contact target portion at a position radially inward from the restricting portion. Therefore, no part of the first portion needs to be concaved radially inward. Consequently, in addition to the advantageous effects of the fifth aspect, the first portion can be formed with ease.

According to the stabilizer bush described in an eighth aspect of the present invention, the inner surface portion is contiguous to the inner peripheral surface of the third portion. Therefore, the load, which is oriented radially inward and transmitted along the inner surface portion when the leading end portion is pressed, is intensively applied to the third portion in the vicinity of the boundary between the first and third portions. This increases the amount of radial pre-compression on the vicinity of the first virtual plane of the bush main body. Consequently, in addition to the advantageous effects of the second aspect, the adhesion durability relative to the stabilizer bar can be improved.

According to the stabilizer bush described in a ninth aspect of the present invention, the inner surface portion is contiguous to the third portion at a position radially outside of the inner peripheral surface of the third portion. Thus, the inner surface portion is unlikely to come into contact with the stabilizer bar even when the radially pre-compressed bush main body is bonded to the stabilizer bar. This inhibits the inner surface portion from rubbing against the stabilizer bar and wearing off. Consequently, in addition to the advantageous effects of the second aspect, worn dust is unlikely to be generated.

According to the stabilizer bush described in a tenth aspect of the present invention, at least one of the inner and outer surface portions is famed in a planar shape. When load is applied to the leading end portion, there is enough room for the inner and outer surface portions to bulge outward as far as the inner and outer surface portions are in a planar shape. Further, when load is applied to the leading end portion, the load received from the leading end portion is applied to the third portion along the inner and outer surface portions having a planar shape. This increases the amount of radial pre-compression on the vicinity of the first virtual plane of the bush main body. Consequently, in addition to the advantageous effects of the second aspect, the adhesion durability relative to the stabilizer bar can be improved.

According to the stabilizer bush described in an eleventh aspect of the present invention, the first and second portions are famed plane-symmetrically with respect to the first virtual plane while the first and second portions are in contact with each other in a no-load state of the bush main body before it is bonded to the stabilizer bar. Therefore, when the inner peripheral surface of the bush main body is to be bonded to the outer peripheral surface of the stabilizer bar in a state where the bush main body is pre-compressed in the radial direction, the amount of pre-compression on the second portion can be made closer to the amount of pre-compression on the first portion than to the amount of pre-compression on the first virtual plane. As a result, the first and second portions are substantially equally unlikely to peel off from the stabilizer bar. Consequently, in addition to the advantageous effects of the first aspect, the adhesion durability relative to the stabilizer bar can be further improved.

According to the stabilizer bush described in a twelfth aspect of the present invention, the inside diameter difference between the inner peripheral surface in the first virtual plane and the inner peripheral surface in the second virtual plane is the substantially same as the first or second portion dimension parallel to the second virtual plane while the first and second portions are in contact with each other in a no-load state before bonding to the stabilizer bar. Therefore, when the circumferential end of the third portion excluding the first portion is abutted on the circumferential end of the third portion excluding the second portion, the inside diameter of the bush main body is substantially uniform in the circumferential direction. Thus, bonding the third portion along the stabilizer bar greatly compresses the first and second portions in the radial direction. As the amount of pre-compression on the first and second portions can be increased, it is possible to increase the amount of radial pre-compression on the vicinity of the first virtual plane of the bush main body. Consequently, in addition to the advantageous effects of the first aspect, the adhesion durability relative to the stabilizer bar can be further improved.

According to the stabilizer bush described in a thirteenth aspect of the present invention, the inside diameter difference between the inner peripheral surface in the first virtual plane and the inner peripheral surface in the second virtual plane is set to be 0.1 to 0.2 times the inside diameter of the inner peripheral surface in the second virtual plane while the first and second portions are in contact with each other in a no-load state before bonding to the stabilizer bar. If the above-mentioned difference is smaller than 0.1 times the inside diameter of the inner peripheral surface in the second virtual plane, the amount of radial pre-compression on the vicinity of the first virtual plane of the bush main body may be insufficient. Further, if the above-mentioned difference is greater than 0.2 times the inside diameter of the inner peripheral surface in the second virtual plane, a great force is required to compress the bush main body. Setting the above-mentioned difference to be 0.1 to 0.2 times the inside diameter of the inner peripheral surface in the second virtual plane makes it possible to easily compress the bush main body while radially applying a sufficient amount of pre-compression to the vicinity of the first virtual plane of the bush main body. Consequently, in addition to the advantageous effects of the first aspect, it is possible to further improve the adhesion durability relative to the stabilizer bar and facilitate the manufacture of the stabilizer bush.

DESCRIPTION OF EMBODIMENTS

Figure 1:
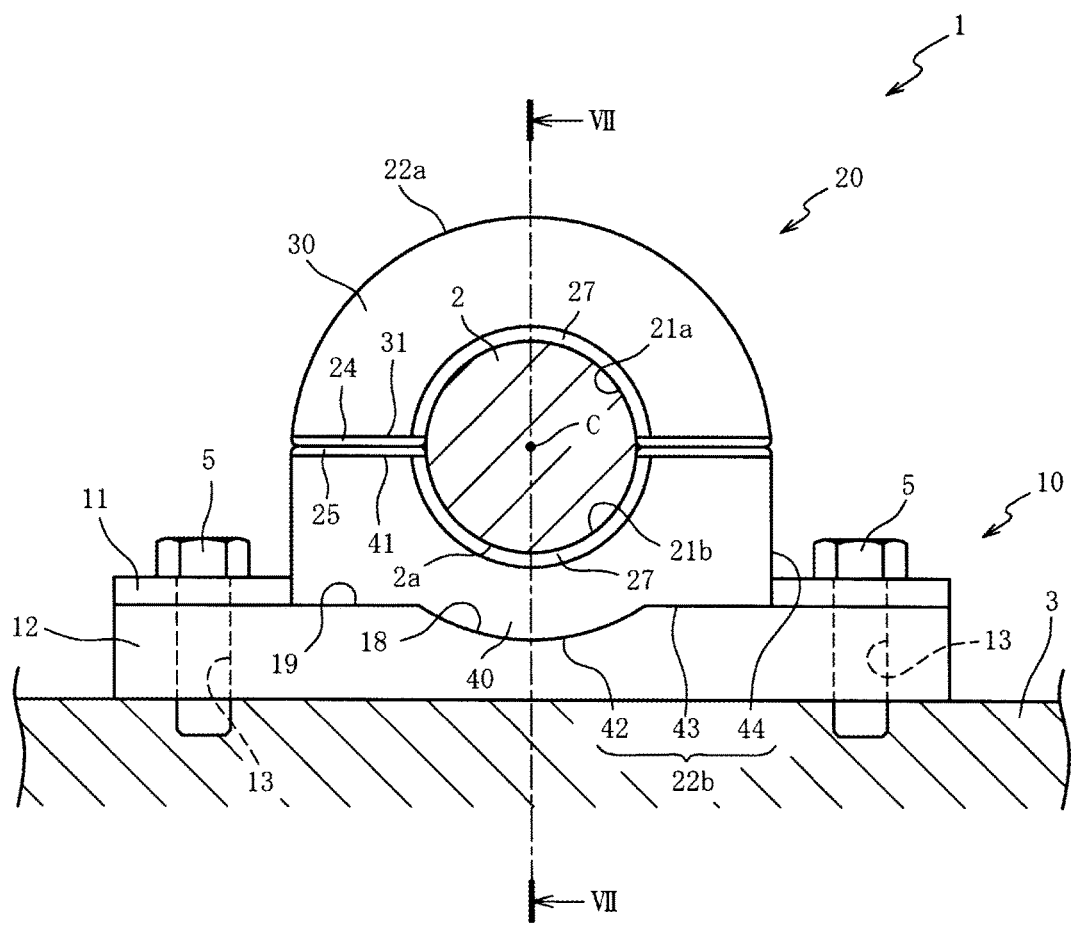
FIG. 1 is a front view of a stabilizer bush according to a first embodiment of the present invention.
Figure 2:
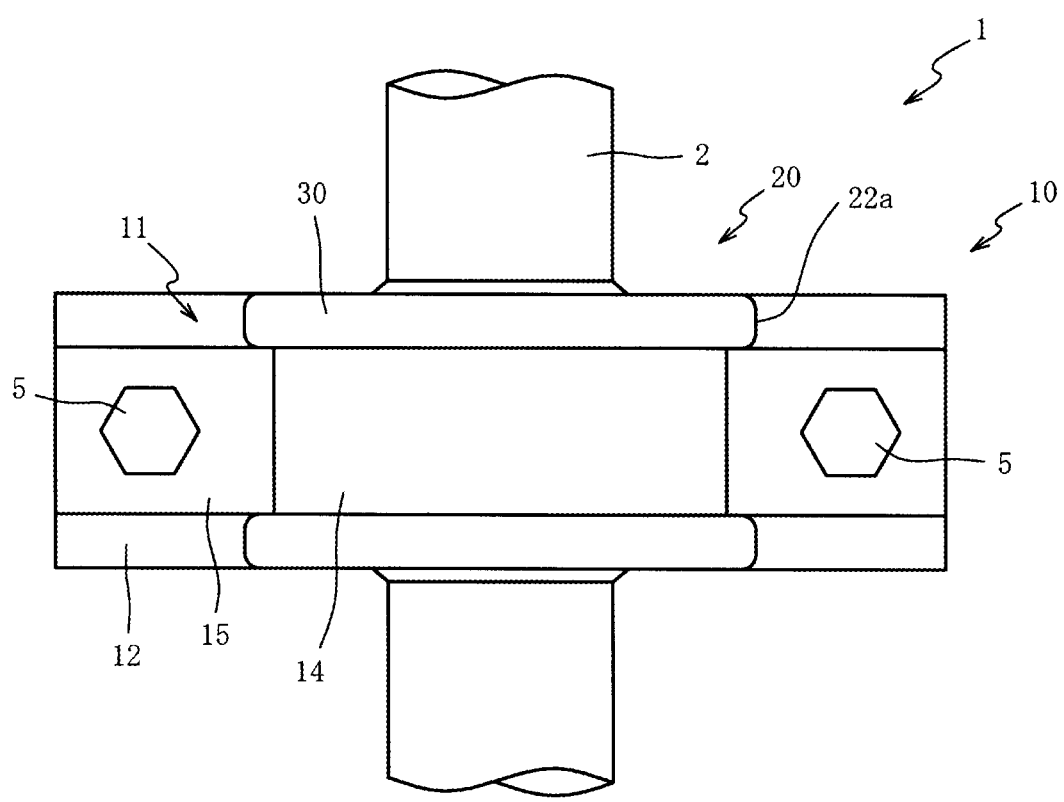
FIG. 2 is a top view of the stabilizer bush.

Preferred embodiments of the present invention will now be described with reference to the accompanying drawings. First of all, a stabilizer bush 1 according to a first embodiment of the present invention will be described with reference to FIGS. 1 and 2. FIG. 1 is a front view of the stabilizer bush 1 according to the first embodiment. FIG. 2 is a top view of the stabilizer bush 1. This description assumes that the up-down direction of FIG. 1 is the up-down direction of the stabilizer bush 1. The up-down direction of the stabilizer bush 1 is opposite to the up-down direction of a vehicle.

As shown in FIGS. 1 and 2, the stabilizer bush 1 is a member that elastically supports a stabilizer bar 2 with respect to a vehicle body 3. The stabilizer bush 1 includes a bush main body 20 and a bracket 10. The bush main body 20 is formed of a cylindrical rubber elastic body. The bracket 10 allows the vehicle body 3 to retain the bush main body 20. The stabilizer bar 2 is a shaft-like member having a cross-sectional shape of a substantially perfect circle.

While the bush main body 20 is radially compressed from outer peripheral surfaces 22a, 22b toward an axial center C, inner peripheral surfaces 21a, 21b are tightly bonded to an outer peripheral surface 2a of the stabilizer bar 2 by using an adhesive (e.g., thermosetting adhesive). In a state where the bush main body 20 is bonded to the stabilizer bar 2, the inner peripheral surfaces 21a, 21b of the bush main body 20 are formed in the shape of a substantially perfect circle centered around the axial center C when viewed in the direction of the axial center C (when viewed from the front). The inner peripheral surface 21a and the outer peripheral surface 22a are the inner peripheral surface and outer peripheral surface of a later-described first elastic body 30. The inner peripheral surface 21b and the outer peripheral surface 22b are the inner peripheral surface and outer peripheral surface of a later-described second elastic body 40.

The bracket 10 is a metal member that radially compresses the bush main body 20 while retaining the bush main body 20. The bracket 10 includes a first bracket 11 and a second bracket 12. The first bracket 11 is disposed above the bush main body 20. The second bracket 12 is disposed below the bush main body 20.

Bolt holes 13 are vertically famed through associated portions of the first bracket 11 and second bracket 12. When bolts 5 are inserted through the bolt holes 13 and fastened to the vehicle body 3, the first bracket 11 and the second bracket 12 are fastened to each other. The bush main body 20 is then retained between the first bracket 11 and the second bracket 12, and the bracket 10 is attached to the vehicle body 3.

Figure 3:
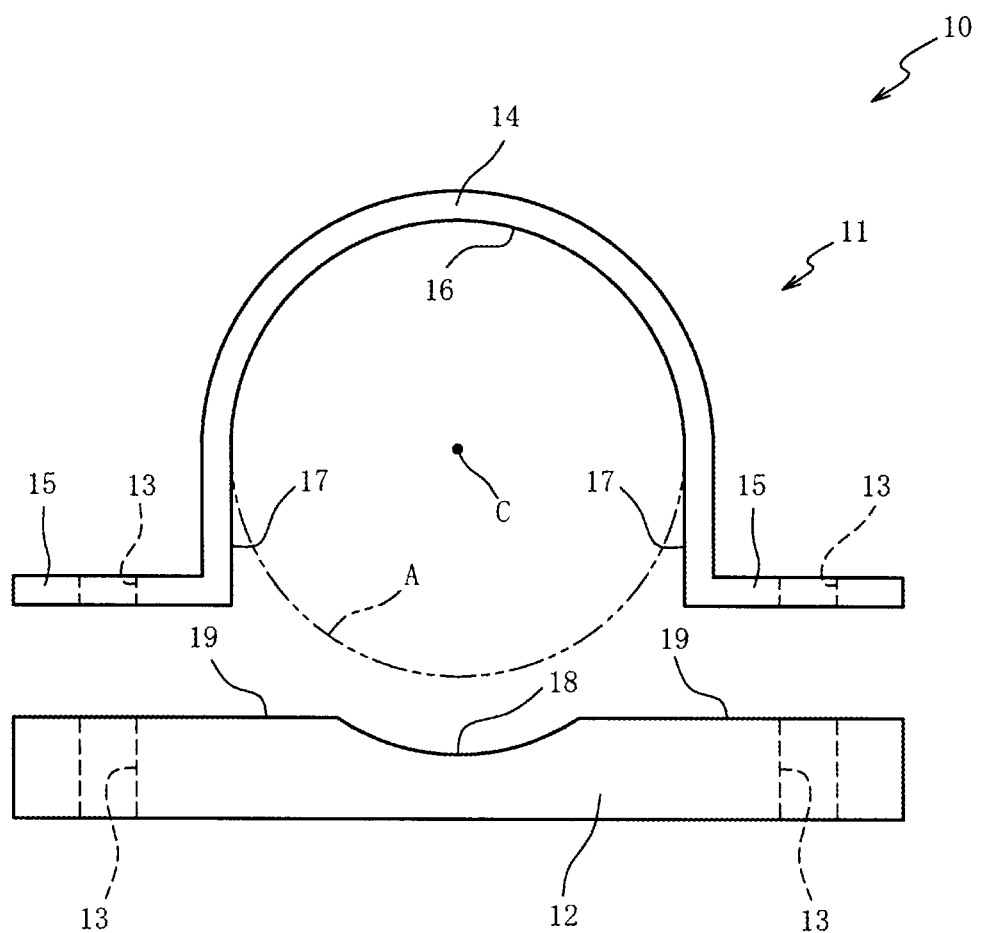
FIG. 3 is a front view of a bracket.

The bracket 10 will now be described in further detail with reference to FIG. 3. FIG. 3 is a front view of the bracket 10. As shown in FIG. 3, the first bracket 11 includes a pressing portion 14 and flanges 15. The pressing portion 14 is in an inverted U shape when viewed from the front. The flanges 15 are projected rightward and leftward, respectively, from opposing ends of the pressing portion 14. The bolt holes 13 are vertically formed through the flanges 15.

The inner surface of the pressing portion 14 presses the bush main body 20. The inner surface of the pressing portion 14 includes a first curved surface 16 and a linear portion 17. The first curved surface 16 is semicircular in shape when viewed from the front. The linear portion 17 is extended downward from the first curved surface 16 and is linear in shape when viewed from the front.

The first curved surface 16 is a semicircular portion of a virtual circle A centered around the axial center C. When the bracket 10 is assembled to the bush main body 20, the axial center C coincides with the axial center C of the bush main body. The first curved surface 16 comes into contact with a later-described third curved surface 32 of the bush main body 20. The linear portion 17 presses the bush main body 20 either rightward or leftward.

The second bracket 12 is a member that is substantially rectangular in shape when viewed from the front. The bolt holes 13 are vertically famed through the right and left ends of the second bracket 12. The upper surface of the second bracket 12, which faces the first bracket 11, includes a second curved surface 18 and a planar portion 19. The second curved surface 18 is curved in a concave manner. The planar portion 19 is positioned on both the right and left sides of the second curved surface 18.

The second curved surface 18 comes into contact with a later-described fourth curved surface 42 of the bush main body 20. The second curved surface 18 is disposed at the right-left center of the second bracket 12. The planar portion 19 comes into contact with the flanges 15 of the first bracket 11 and with a later-described first linear portion 43 of the bush main body 20. The planar portion 19 is famed in parallel with the lower surface of the second bracket 12.

Figure 4:
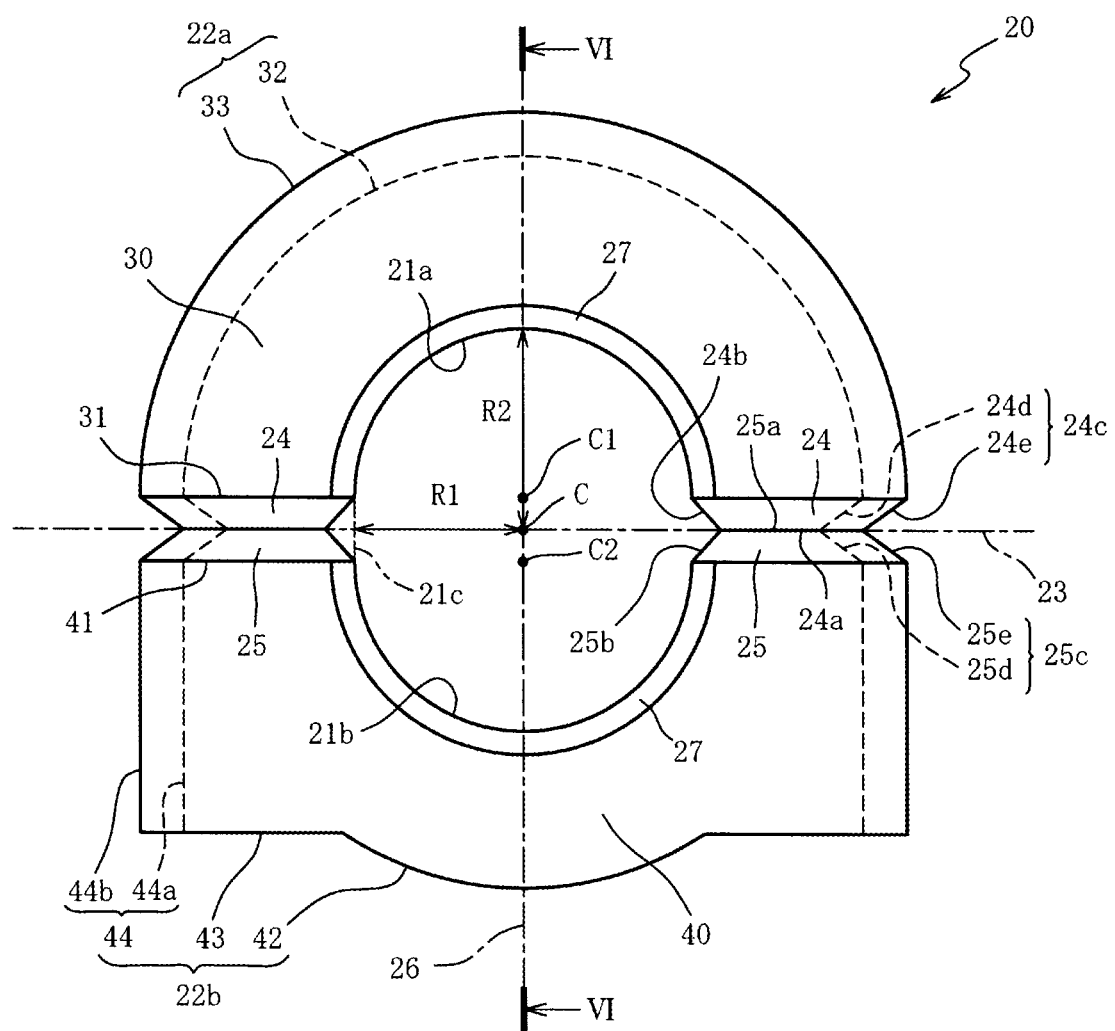
FIG. 4 is a front view of a bush main body.
Figure 5A:
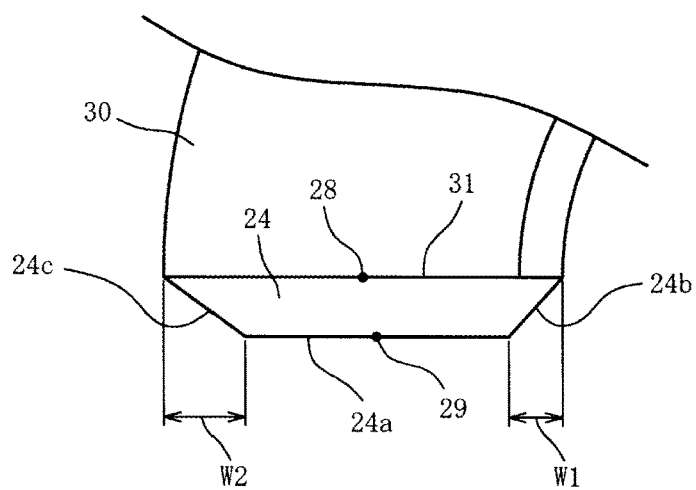
FIG. 5A is an enlarged view of a first portion.
Figure 5B:
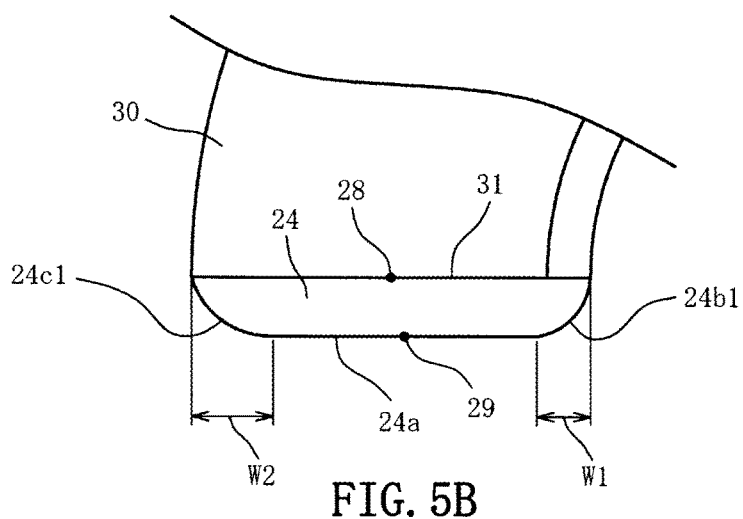
FIG. 5B is an enlarged view illustrating a first modification of the first portion.
Figure 5C:
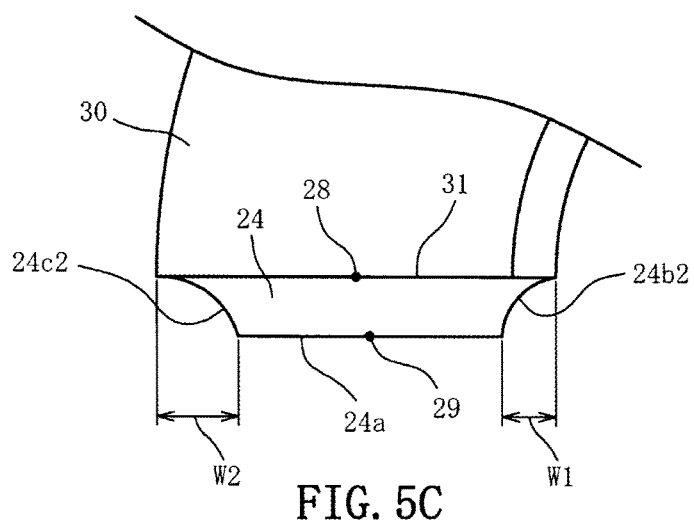
FIG. 5C is an enlarged view illustrating a second modification of the first portion.
Figure 6:
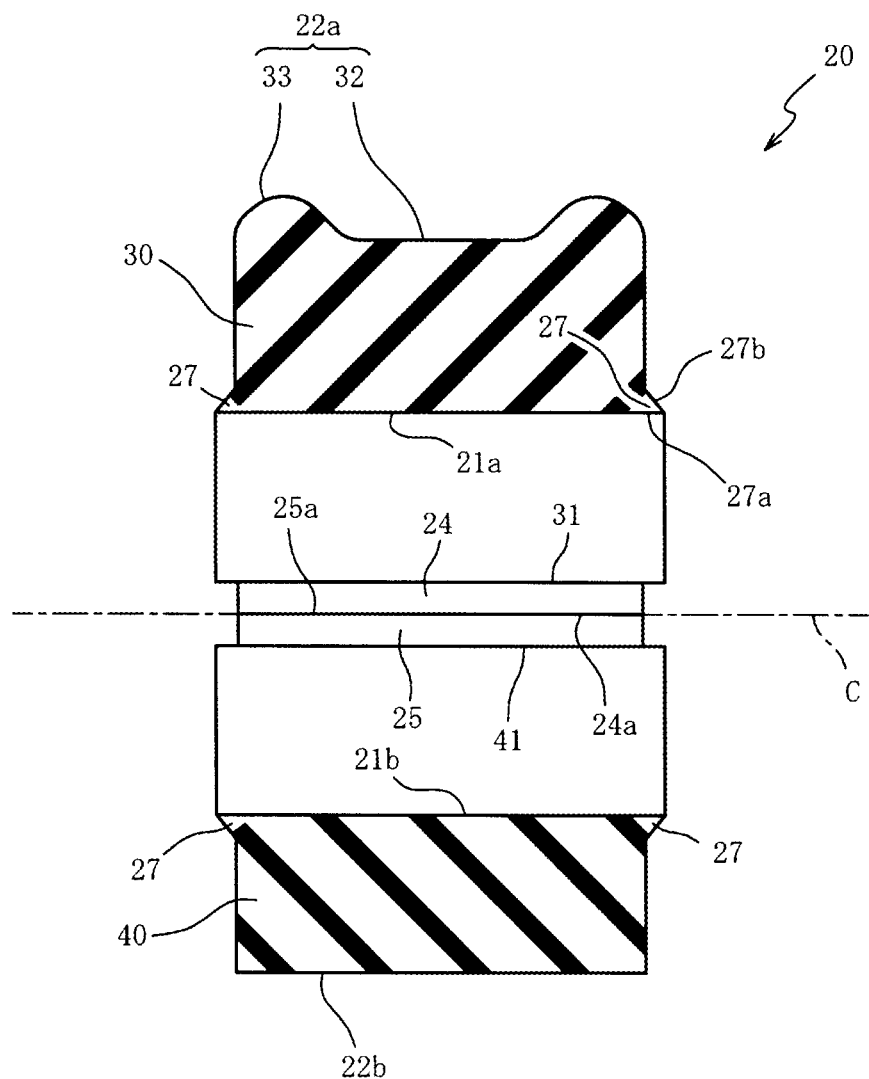
FIG. 6 is a cross-sectional view of the bush main body taken along line VI-VI of FIG. 4.

The bush main body 20 will now be described in detail with reference to FIGS. 4 to 6. FIG. 4 is a front view of the bush main body 20. FIG. 5A is an enlarged view of a first portion 24. FIG. 5B is an enlarged view illustrating a first modification of the first portion 24. FIG. 5C is an enlarged view illustrating a second modification of the first portion 24. FIG. 6 is a cross-sectional view of the bush main body 20 taken along line VI-VI of FIG. 4. FIGS. 4 to 6 show the bush main body 20 in a no-load state.

As shown in FIG. 4, the bush main body 20 is circumferentially divided by a first virtual plane 23. The first virtual plane 23 includes the axial center C. The bush main body 20 includes a first portion 24, a second portion 25, a first elastic body 30 (a part of a third portion), and a second elastic body 40 (a part of the third portion). The first portion 24 is disposed on one side (upper side) of the first virtual plane 23 and extended over a predetermined circumferential distance from the first virtual plane 23. The second portion 25 is disposed on the other side (lower side) of the first virtual plane 23 and extended over a predetermined circumferential distance from the first virtual plane 23. The first elastic body 30 is a portion that is positioned above the first virtual plane 23 and is other than the first portion 24. The second elastic body 40 is a portion that is positioned below the first virtual plane 23 and other than the second portion 25. The predetermined distance over which the first portion 24 and the second portion 25 are disposed is the up-down dimension of the first and second portions 24, 25, and is set to be 0.1 to 0.2 times the inside diameter R2 of the bush main body 20 in a second virtual plane 26. The second virtual plane 26 includes the axial center C and is perpendicular to the first virtual plane 23.

The first elastic body 30 is a member that is semi-cylindrical in shape when viewed from the front. The inner peripheral surface 21a and outer peripheral surface 22a of the first elastic body 30 are famed in a semicircular shape centered around an axial center C1. The axial center C1 is positioned slightly above the axial center C. In a no-load state of the first elastic body 30 before it is bonded to the stabilizer bar 2, the axial center C1 is positioned on the extension line of a boundary 31. While the radially compressed bush main body 20 is bonded to the stabilizer bar 2, the axial center C1 coincides with the axial center C.

As shown in FIGS. 4 and 6, the outer peripheral surface 22a of the first elastic body 30 includes a third curved surface 32 (contact target portion) and a restricting portion 33. The third curved surface 32 is disposed at the center in the axial direction (in the direction of the axial center C). The restricting portion 33 is disposed at each axial end of the third curved surface 32. The first curved surface 16 of the first bracket 11 (see FIG. 3) comes into contact with the third curved surface 32.

The radial dimension between the axial center C1 and the third curved surface 32 is set to be slightly greater than the radial dimension between the axial center C and the first curved surface 16 of the first bracket 11. Therefore, when fitted into the first bracket 11, the first elastic body 30 is radially compressed.

The restricting portion 33 is projected radially outward with respect to the third curved surface 32. Therefore, while the first curved surface 16 is in contact with the third curved surface 32, the first bracket 11 and the first elastic body 30 are prevented from relative axial movement.

The second elastic body 40 is a member that is substantially semi-cylindrical in shape when viewed from the front. The inner peripheral surface 21b of the second elastic body 40 is famed in a semicircular shape centered around an axial center C2 that is positioned slightly below the axial center C. In a no-load state of the second elastic body 40 before it is bonded to the stabilizer bar 2, the axial center C2 is positioned on the extension line of a boundary 41. While the radially compressed bush main body 20 is bonded to the stabilizer bar 2, the axial center C2 coincides with the axial center C.

The outer peripheral surface 22b of the second elastic body 40 includes a fourth curved surface 42, a first linear portion 43, and a second linear portion 44. The fourth curved surface 42 is formed in such a manner that the right-left center (the center in a direction parallel to the first virtual plane 23) is convexly curved radially outward. The first linear portion 43 is famed from the fourth curved surface 42 in parallel with the first virtual plane 23. The second linear portion 44 is extended vertically upward from both the right and left ends of the first linear portion 43.

The fourth curved surface 42 comes into contact with the second curved surface 18 of the second bracket 12 (see FIG. 3). The first linear portion 43 comes into contact with the planar portion 19 of the second bracket 12 when the fourth curved surface 42 and the second curved surface 18 come into contact with each other. The fourth curved surface 42 and the first linear portion 43 are famed in substantially the same shape as the second curved surface 18 and the planar portion 19.

The second linear portion 44 includes a contact target portion 44a and a restricting portion 44b. The linear portion 17 of the first bracket 11 comes into contact with the contact target portion 44a at the center in the axial direction. The restricting portion 44b is disposed at each axial end of the contact target portion 44a. The contact target portion 44a is flat in the up-down direction and in the axial direction. The contact target portion 44a is disposed perpendicularly to the first virtual plane 23. The right-left dimension between each contact target portion 44a is set to be slightly greater than the right-left dimension between each linear portion 17 of the first bracket 11. Therefore, when fitted into the first bracket 11, the second elastic body 40 is compressed in the right-left direction.

The restricting portion 44b is projected radially outward with respect to the contact target portion 44a. Therefore, while the linear portion 17 is in contact with the contact target portion 44a, the first bracket 11 and the second elastic body 40 are prevented from relative axial movement.

The first portion 24 is molded integrally with the first elastic body 30. The first portion 24 is shaped so that it is projected from each circumferential end of the first elastic body 30. That is to say, the boundary 31 between the first portion 24 and the first elastic body 30 is the circumferential end of the first elastic body 30. The lower surface of the first portion 24, which is positioned apart from the boundary 31, includes a leading end portion 24a, an inner surface portion 24b, and an outer surface portion 24c. The leading end portion 24a is at the leading end. The inner surface portion 24b is positioned radially inward from the leading end portion 24a. The outer surface portion 24c is positioned radially outward from the leading end portion 24a.

The leading end portion 24a is planar in shape and is flush with the first virtual plane 23. While the first portion 24 and the second portion 25 are in contact with each other in a no-load state of the bush main body 20 before it is bonded to the stabilizer bar 2, the leading end portion 24a comes into contact with the second portion 25.

The inner surface portion 24b places the radially inner end of the leading end portion 24a in communication with the first elastic body 30. The inner surface portion 24b is tilted with respect to the first virtual plane 23. The inner surface portion 24b is contiguous to the inner peripheral surface 21a of the first elastic body 30.

The outer surface portion 24c places the radially outer end of the leading end portion 24a in communication with the first elastic body 30. The outer surface portion 24c is tilted with respect to the first virtual plane 23. The outer surface portion 24c is contiguous to the outer peripheral surface 22a (third curved surface 32 and restricting portion 33) of the first elastic body 30. The outer surface portion 24c includes a concave portion 24d and a convex portion 24e. The concave portion 24d is contiguous to the third curved surface 32. The convex portion 24e is contiguous to the restricting portion 33. The concave portion 24d is positioned at the axial center of the outer surface portion 24c. The concave portion 24d is concaved radially inward with respect to the convex portion 24e. The convex portion 24e is positioned on each axial side of the concave portion 24d. The concave portion 24d and the convex portion 24e are tilted at substantially the same angle with respect to the first virtual plane 23.

As shown in FIG. 5A, the radial center 29 of the leading end portion 24a is positioned radially inward from the radial center 28 of the boundary 31. Further, the radial dimension W2 of the outer surface portion 24c is set to be greater than the radial dimension W1 of the inner surface portion 24b.

In the first embodiment, the inner surface portion 24b and the outer surface portion 24c are famed in a linear shape (in a planar shape) when viewed in the direction of the axial center C. However, as shown in FIG. 5B, an inner surface portion 24b1 and an outer surface portion 24c1 may be famed in a convexly curved shape when viewed in the direction of the axial center C. Further, as shown in FIG. 5C, an inner surface portion 24b2 and an outer surface portion 24c2 may be formed in a concavely curved shape when viewed in the direction of the axial center C.

In the case of FIG. 5B, there is limited room for the inner and outer surface portions 24b1, 24c1 to bulge outward when the leading end portion 24a receives load. Therefore, the amount of radial deformation to be applied to the first portion 24 may be insufficient. In the case of FIG. 5C, when the leading end portion 24a receives load, the load is exerted on the first elastic body 30 along the tangent between the inner surface portion 24b2 and the outer surface portion 24c2. Therefore, the amount of radial defamation to be applied to the first portion 24 and the first elastic body 30 may be insufficient.

Meanwhile, when the leading end portion 24a receives load in the case of FIG. 5A, there is enough room for the inner and outer surface portions 24b, 24c to bulge outward. Additionally, when the leading end portion 24a receives load, the load delivered from the leading end portion 24a can be exerted on the first elastic body 30 along the linear inner surface portion 24b and outer surface portion 24c. As a result, a sufficient amount of radial deformation can be applied to the first portion 24 and the first elastic body 30. This makes it possible to increase the amount of radial pre-compression on the vicinity of the first virtual plane 23 of the bush main body 20.

Returning to FIG. 4, further description will be given. The second portion 25 is molded integrally with the second elastic body 40. The second portion 25 is disposed opposite the first portion 24 with the first virtual plane 23 sandwiched in between. The second portion 25 is shaped so that it is projected from each circumferential end of the second elastic body 40. That is to say, the boundary 41 between the second portion 25 and the second elastic body 40 is the circumferential end of the second elastic body 40. The upper surface of the second portion 25, which is positioned apart from the boundary 41, includes a leading end portion 25a, an inner surface portion 25b, and an outer surface portion 25c. The leading end portion 25a is at the leading end. The inner surface portion 25b is positioned radially inward from the leading end portion 25a. The outer surface portion 25c is positioned radially outward from the leading end portion 25a. The outer surface portion 25c of the second portion 25 includes a concave portion 25d and a convex portion 25e. The concave portion 25d is contiguous to the contact target portion 44a. The convex portion 25e is contiguous to the restricting portion 44b.

The second portion 25 and the first portion 24 are formed plane-symmetrically with respect to the first virtual plane 23 while the second portion 25 and the first portion 24 are in contact with each other in a no-load state of the bush main body 20 before it is bonded to the stabilizer bar 2. Elements of the second portion 25 have the same configuration as those of the first portion 24, and will not be redundantly described.

The inner peripheral surface of the bush main body 20 is concaved radially outward at the first and second portions 24, 25, and is smoothly continuous at a portion excluding the first and second portions 24, 25 (at the inner peripheral surface 21a of the first elastic body 30 and at the inner peripheral surface 21b of the second elastic body 40). The outer peripheral surface of the bush main body 20 is concaved radially inward at the first and second portions 24, 25, and is smoothly continuous at a portion excluding the first and second portions 24, 25 (at the outer peripheral surface 22a of the first elastic body 30 and at the outer peripheral surface 22b of the second elastic body 40).

When the inside diameter of the inner peripheral surface of the bush main body 20 is described in a case where the inner peripheral surface of the bush main body 20 is concaved by the inner surface portions 24b, 25b of the first and second portions 24, 25 as described above, this description ignores such a concave portion. Further, it is assumed that the inside diameter of the concaved inner peripheral surface of the bush main body 20 is the distance between the axial center C and a virtual inner peripheral surface 21c. The virtual inner peripheral surface 21c is obtained by smoothly connecting the inner peripheral surface 21a of the first elastic body 30 to the inner peripheral surface 21b of the second elastic body 40 along their curved surfaces. As described above, this description defines the inside diameter as the radius measured from the axial center C to the inner peripheral surface 21a, 21b or the virtual inner peripheral surface 21c.

The inside diameter R2 of the inner peripheral surfaces 21a, 21b in the second virtual plane 26 is set to be greater than the inside diameter R1 of the first virtual plane 23 while the first and second portions 24, 25 are in contact with each other in a no-load state before the bush main body 20 is bonded to the stabilizer bar 2. The difference between the inside diameter R1 and the inside diameter R2 is substantially the same as the up-down dimension of the first or second portion 24, 25 (the dimension parallel to the second virtual plane 26), that is, the distance between the axial center C1 and the axial center C2. When the first and second portions 24, 25 are removed while the circumferential ends of the first and second elastic bodies 30, 40 in a no-load state abut on each other, the inside diameter of the bush main body 20 is substantially uniform in the circumferential direction.

As shown in FIG. 6, a lip 27 is provided for the first and second elastic bodies 30, 40 of the bush main body 20. The lip 27 is projected in the axial direction from the axial center C of each axial end. The lip 27 is annular in shape and formed integrally with the bush main body 20. A semi-annular part of the lip 27 is provided for each of the first and second elastic bodies 30, 40 (see FIG. 4).

The inner peripheral surface 27a of the lip 27 is contiguous to the inner peripheral surfaces 21a, 21b of the bush main body 20, which is parallel to the axial center C, and is formed in parallel with the axial center C. That is to say, the inner peripheral surface 27a of the lip 27 and the inner peripheral surfaces 21a, 21b of the bush main body 20 are famed linearly in the cross-section including the axial center C. The outer peripheral surface of the lip 27 includes an outer sloped portion 27b that approaches the axial center C with an increase in the distance from the bush main body 20. The outer sloped portion 27b is formed contiguously to the axial end of the bush main body 20.

Figure 7:
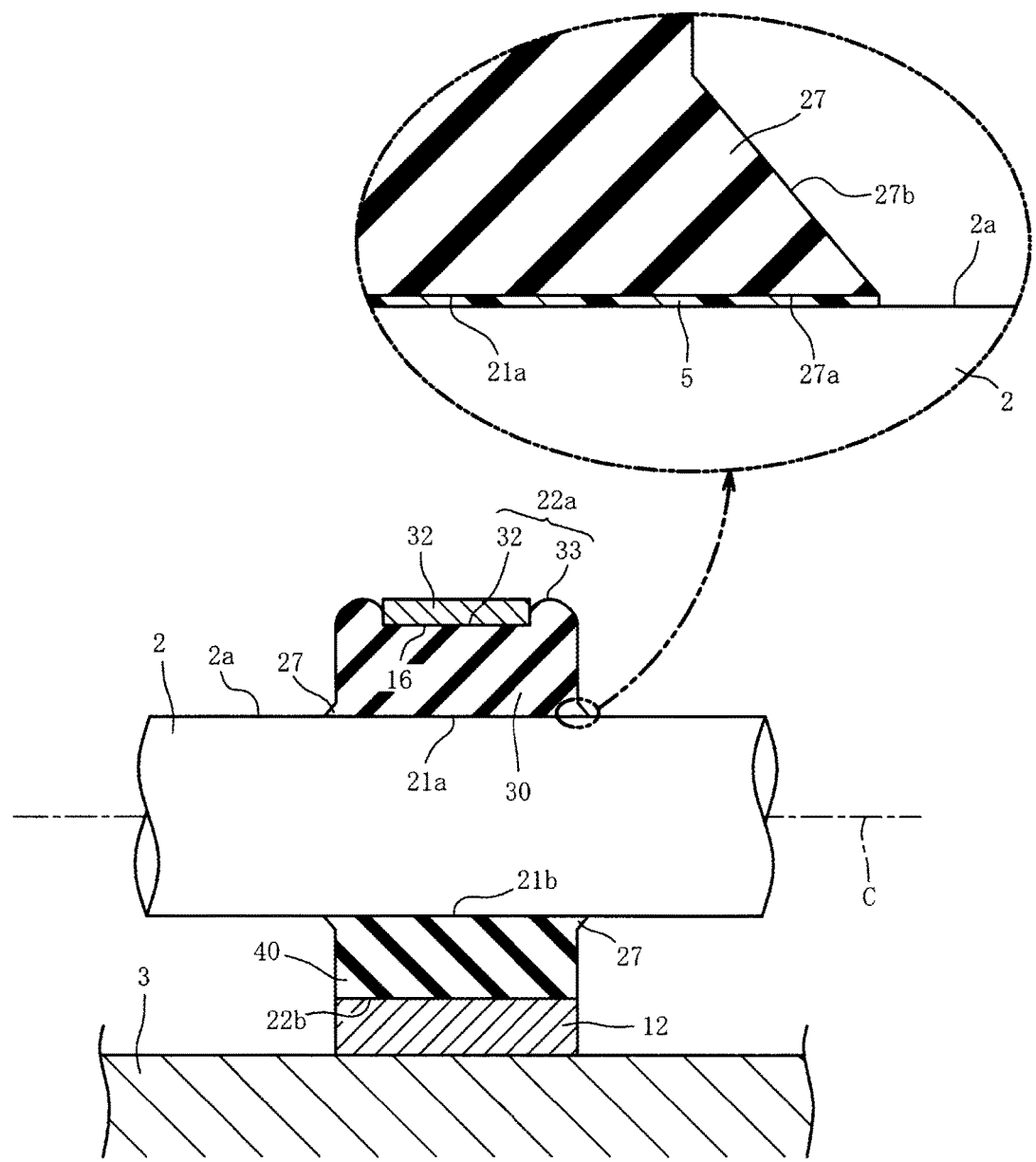
FIG. 7 is a cross-sectional view of the stabilizer bush taken along line VII-VII of FIG. 1.

A procedure for assembling the stabilizer bush 1 will now be described with reference to FIG. 7. FIG. 7 is a cross-sectional view of the stabilizer bush 1 taken along line VII-VII of FIG. 1. First of all, a thermosetting adhesive (e.g., thermosetting epoxy resin adhesive) is applied to the inner peripheral surface 21a of the first elastic body 30, the inner peripheral surface 21b of the second elastic body 40, and the inner peripheral surface 27a of the lip 27 in order to mount the stabilizer bush 1 on the stabilizer bar 2. Alternatively, the thermosetting adhesive may be applied to the outer peripheral surface 2a of the stabilizer bar 2 instead of applying the adhesive to the inner peripheral surface 21a, the inner peripheral surface 21b, and the inner peripheral surface 27a. The applied thermosetting adhesive forms an adhesive layer 4 that bonds the bush main body 20 and the lip 27 to the stabilizer bar 2.

Next, the stabilizer bar 2 is sandwiched between the first elastic body 30 and the second elastic body 40. A compression member (not shown) is then used to compress the bush main body 20 in the radial direction in order to bring the inner peripheral surfaces 21a, 21b of the first and second elastic bodies 30, 40 into close contact with the outer peripheral surface 2a of the stabilizer bar 2. Next, the bush main body 20 is heated to cure the thermosetting adhesive in the adhesive layer 4 until the bush main body 20 is tightly bonded to the stabilizer bar 2. When the compression member is removed after the adhesive layer 4 is cured, the stabilizer bar 2 on which the stabilizer bush 1 is mounted is obtained.

Subsequently, the bush main body 20 is vertically sandwiched between the first bracket 11 and the second bracket 12. The first bracket 11 and the second bracket 12 are then fastened to the vehicle body 3 with bolts 5. As the dimension between the first and second brackets 11, 12 is set to be greater than the associated dimension of the bush main body 20, the bush main body 20 is radially compressed by the first and second brackets 11, 12. Consequently, while the bush main body 20 is pre-compressed in the radial direction, the stabilizer bush 1 mounted on the stabilizer bar 2 is assembled to the vehicle body 3.

When the bush main body 20 is to be bonded to the stabilizer bar 2, the compression member need not always be used. The bush main body 20 may alternatively be compressed by using the first and second brackets 11, 12 instead of the compression member. When such an alternative method is used, the stabilizer bush 1 can be assembled to the vehicle body 3 without removing the first and second brackets 11, 12 after the adhesive layer 4 is cured.

As described above, the stabilizer bush 1 according to the first embodiment sets the inner peripheral surfaces 21a, 21b of the bush main body 20 in such a manner that the inside diameter R2 in the second virtual plane 26 is greater than the inside diameter R1 in the first virtual plane 23 while the first and second portions 24, 25 are in contact with each other in a no-load state of the bush main body 20 before it is bonded to the stabilizer bar 2. Further, when the radially pre-compressed bush main body 20 is bonded to the stabilizer bar 2, the inner peripheral surfaces 21a, 21b of the bush main body 20 are tightly bonded to the outer peripheral surface 2a of the stabilizer bar 2. As a result, the bush main body 20 is pre-compressed more intensively in a direction perpendicular to the first virtual plane 23 (in the up-down direction) than in a direction parallel to the first virtual plane 23 (in the right-left direction).

In particular, the vicinity of the first virtual plane 23 of the bush main body 20, which is positioned to the right and left of the stabilizer bar 2, is vertically compressed and urged to expand in the radial direction. However, such an expansion is blocked by the stabilizer bar 2. This increases the amount of radial pre-compression on the vicinity of the first virtual plane 23 of the bush main body 20. Therefore, when load oriented in the prying direction is inputted to the stabilizer bar 2, a tensile force is unlikely to be applied to the adhesive layer 4 that bonds the bush main body 20 to the stabilizer bar 2. This results in improvement of the adhesion durability between the stabilizer bar 2 and the stabilizer bush 1.

When the first and second portions 24, 25 are removed while the circumferential ends of the first and second elastic bodies 30, 40 in a no-load state abut on each other, the inside diameter of the bush main body 20 is substantially uniform in the circumferential direction. Therefore, bonding the first and second elastic bodies 30, 40 along the stabilizer bar 2 greatly compresses the first and second portions 24, 25 in the up-down direction. This increases the amount of pre-compression on the first and second portions 24, 25. Accordingly, it is possible to increase the amount of radial pre-compression on the vicinity of the first virtual plane 23 of the bush main body 20. This results in improvement of the adhesion durability between the stabilizer bar 2 and the stabilizer bush 1.

Further, the difference between the inside diameter R1 and the inside diameter R2 is set to be the up-down dimension of the first portion 24, which is 0.1 to 0.2 times the inside diameter R2. When the up-down dimension of the first portion 24 is smaller than 0.1 times the inside diameter R2, the amount of up-down compression on the bush main body 20 decreases. Therefore, the amount of radial pre-compression on the vicinity of the first virtual plane 23 of the bush main body 20 may be insufficient. Further, when the up-down dimension of the first portion 24 is greater than 0.2 times the inside diameter R2, a great force is required to compress the bush main body 20 in the up-down direction. This makes it difficult to manufacture the stabilizer bush 1. Meanwhile, in the first embodiment, the up-down dimension of the first portion 24 is set to be 0.1 to 0.2 times the inside diameter R2. This facilitates the manufacture of the stabilizer bush 1 while radially applying a sufficient amount of pre-compression to the vicinity of the first virtual plane 23 of the bush main body 20.

When the radially compressed bush main body 20 is to be bonded to the stabilizer bar 2, the leading end portions 24*a*, 25*a* are mutually pressed. The load received by the leading end portions 24*a*, 25*a* is then applied to the first and second portions 24, 25 along the inner surface portions 24*b*, 25*b* and the outer surface portions 24*c*, 25*c*. Thus, the first and second portions 24, 25 are urged to expand in the radial direction. Additionally, portions of the first and second elastic bodies 30, 40 that are contiguous to the inner surface portions 24*b*, 25*b* and the outer surface portions 24*c*, 25*c* are also urged to expand in the radial direction. However, as such expansions are blocked by the stabilizer bar 2, the amount of radial pre-compression on the vicinity of the first virtual plane 23 of the bush main body 20 is further increased. This results in further improvement of the adhesion durability between the stabilizer bar 2 and the stabilizer bush 1.

The radial centers 29 of the leading end portions 24*a*, 25*a* are positioned radially inward from the radial centers 28 of the boundaries 31, 41, respectively. Therefore, the load received by each of the leading end portions 24*a*, 25*a* is intensively exerted on the radial inside of the vicinity of the first virtual plane 23 of the bush main body 20. Consequently, the amount of radial pre-compression on the vicinity of the first virtual plane 23 of the bush main body 20 is increased. This results in further improvement of the adhesion durability between the stabilizer bar 2 and the stabilizer bush 1.

The radial dimension W2 of the outer surface portions 24*c*, 25*c* is set to be greater than the radial dimension W1 of the inner surface portions 24*b*, 25*b*. Therefore, the load received by each of the leading end portions 24*a*, 25*a* is supported to a greater extent by the outer surface portions 24*c*, 25*c* than by the inner surface portions 24*b*, 25*b*. The vicinity of the first virtual plane 23 of the bush main body 20 is then likely to deform radially inward. Accordingly, the amount of radial pre-compression can be increased. This results in further improvement of the adhesion durability between the stabilizer bar 2 and the stabilizer bush 1.

The greater the extent to which the radial dimension W2 of the outer surface portions 24*c*, 25*c* is greater than the radial dimension W1 of the inner surface portions 24*b*, 25*b*, the greater the extent to which the support provided by the outer surface portions 24*c*, 25*c* in relation to the load received by each of the leading end portions 24*a*, 25*a* is greater than the support provided by the inner surface portions 24*b*, 25*b*. Therefore, the greater the extent to which the radial dimension W2 of the outer surface portions 24*c*, 25*c* is greater than the radial dimension W1 of the inner surface portions 24*b*, 25*b*, the greater the amount of radial pre-compression. This results in further improvement of the adhesion durability between the stabilizer bar 2 and the stabilizer bush 1.

The outer surface portions 24*c*, 25*c* are respectively contiguous to the outer peripheral surface 22*a* of the first elastic body 30 and the outer peripheral surface 22*b* of the second elastic body 40. This ensures that the radial dimension W2 of the outer surface portions 24*c*, 25*c* is sufficient. The load received by each of the leading end portions 24*a*, 25*a* is then easily supported by the outer surface portions 24*c*, 25*c*. Therefore, the first and second portions 24, 25 are unlikely to deform radially outward and likely to deform radially inward. This increases the amount of radial pre-compression on the vicinity of the first virtual plane 23 of the bush main body 20. As a result, the adhesion durability between the stabilizer bar 2 and the stabilizer bush 1 is further improved.

The inner surface portions 24*b*, 25*b* are respectively contiguous to the inner peripheral surface 21*a* of the first elastic body 30 and the inner peripheral surface 21*b* of the second elastic body 40. Therefore, the radially inward load, which is transmitted along the inner surface portions 24*b*, 25*b* when the leading end portions 24*a*, 25*a* are mutually pressed, is intensively exerted on the first and second elastic bodies 30, 40 in the vicinity of the boundaries 31, 41. Consequently, the amount of radial pre-compression on the vicinity of the first virtual plane 23 of the bush main body 20 is increased. This improves the adhesion durability between the stabilizer bar 2 and the stabilizer bush 1.

While the first and second portions 24, 25 are in contact with each other in a no-load state of the bush main body 20 before it is bonded to the stabilizer bar 2, the first and second portions 24, 25 are famed plane-symmetrically with respect to the first virtual plane 23. Therefore, the amount of radial pre-compression on the vicinity of the first virtual plane 23 of the bush main body 20 can be made closer on the first and second portions 24, 25 than on the first virtual plane 23. As a result, the first and second portions 24, 25 of the bush main body 20 are substantially equally unlikely to peel off from the stabilizer bar 2. Consequently, the adhesion between the stabilizer bar 2 and the first or second portion 24, 25 of the bush main body 20, whichever is likely to peel off, is inhibited from peeling off. This further improves the adhesion durability between the stabilizer bar 2 and the stabilizer bush 1.

In the up-down direction of the inner peripheral surfaces 21*a*, 21*b* (in a direction perpendicular to the first virtual plane 23), the third curved surface 32 of the bush main body 20 is in contact with the first curved surface 16 of the first bracket 11, and the fourth curved surface 42 of the bush main body 20 is in contact with the second curved surface 18 of the second bracket 12. The third curved surface 32 and the first curved surface 16 are in substantially the same shape along the circumferential direction and convexed radially outward. The fourth curved surface 42 and the second curved surface 18 are in substantially the same shape along the circumferential direction and convexed radially outward.

Consequently, when the bush main body 20 bonded to the stabilizer bar 2 is vertically sandwiched between the first bracket 11 and the second bracket 12 and is vertically pre-compressed, the amount of pre-compression on the bush main body 20 between the first and second curved surfaces 16, 18 and the stabilizer bar 2 is made substantially uniform in the circumferential direction. When the amount of pre-compression on the bush main body 20 significantly varies in the circumferential direction, great stress is partially applied to the adhesive layer 4 between the bush main body 20 and the stabilizer bar 2. In such an instance, the adhesion between the bush main body 20 and the stabilizer bar 2 may be likely to peel off. Meanwhile, the first embodiment makes the amount of pre-compression on the bush main body 20 substantially uniform in the circumferential direction. This improves the adhesion durability between the stabilizer bar 2 and the stabilizer bush 1.

Further, beneath the first and second portions 24, 25, the planar portion 19 of the second bracket 12, which is parallel to the first virtual plane 23, comes into contact with the first linear portion 43 of the bush main body 20. Therefore, when the bush main body 20 bonded to the stabilizer bar 2 is vertically sandwiched between the first and second brackets 11, 12 and is vertically pre-compressed, the following result is obtained. A reaction force perpendicular to the first virtual plane 23 can be applied in a substantially uniform manner along the first virtual plane 23 from the planar portion 19 toward the first and second portions 24, 25. Thus, the first and second portions 24, 25 can easily be compressed between the first elastic body 30 and the second elastic body 40. Therefore, the compression of the first and second portions 24, 25 increases the amount of radial pre-compression on the vicinity of the first virtual plane 23 of the bush main body 20. As a result, the adhesion durability between the stabilizer bar 2 and the stabilizer bush 1 is improved.

In the past, the lip 27 was not provided for the bush main body, but axial end corners of the inner peripheral surfaces 21a, 21b of the bush main body were chamfered. The chamfering is performed to inhibit a shear stress from being applied to the adhesive layer 4 between the bush main body and the stabilizer bar 2 when the bush main body is compressively defamed in the prying direction to permit axial expansion of the bush main body in the vicinity of the stabilizer bar 2. The adhesion between the stabilizer bar 2 and the bush main body is unlikely to peel off due to a chamfered portion. However, the chamfered portion is not bonded to the stabilizer bar 2. Therefore, if the bush main body 20 is compressively deformed in the prying direction, such a non-bonded portion rubs against the stabilizer bar 2. Due to such rubbing, the bush main body detrimentally wears off to generate worn dust.

Meanwhile, in the first embodiment, the adhesive layer 4 is famed not only between the inner peripheral surfaces 21a, 21b of the bush main body 20 and the outer peripheral surface 2a of the stabilizer bar 2, but also between the inner peripheral surface 27a of the lip 27 and the outer peripheral surface 2a. Therefore, when the bush main body 20 bonded to the stabilizer bar 2 is compressively defamed in the prying direction, the load received from the bush main body 20 causes the lip 27 to expand toward the outer peripheral surface (outer sloped portion 27b). This absorbs the axial expansion of the bush main body 20 in the vicinity of the stabilizer bar 2. As a result, a shear stress is unlikely to be applied to the adhesive layer 4 between the bush main body 20, the lip 27, and the stabilizer bar 2. Consequently, the adhesion between the bush main body 20, the lip 27, and the stabilizer bar 2 is unlikely to peel off.

Further, as the lip 27 is bonded to the stabilizer bar 2, the stabilizer bar 2 is inhibited from coming into contact with non-bonded portions, such as the axial end of the bush main body 20 and the outer sloped portion 27b of the lip 27, even if the bush main body 20 is compressively deformed in the prying direction. This prevents the non-bonded portions from rubbing against the stabilizer bar 2 and wearing off. As a result, worn dust is unlikely to be generated due to wearing off while adequate adhesion durability is provided between the stabilizer bar 2 and the stabilizer bush 1.

The outer sloped portion 27b, which is the outer peripheral surface of the lip 27 and contiguous to the bush main body 20, approaches the axial center C with an increase in the distance from the bush main body 20. Therefore, when the bush main body 20 bonded to the stabilizer bar 2 is compressively defamed in the prying direction, the load received from the bush main body 20 is exerted on the lip 27 along the outer sloped portion 27b. Thus, the lip 27 is likely to expand toward an outer periphery. This makes it easy for the lip 27 to absorb the axial expansion of the bush main body 20 in the vicinity of the stabilizer bar 2. Consequently, the outer sloped portion 27b ensures that the adhesion between the bush main body 20, the lip 27, and the stabilizer bar 2 is unlikely to peel off. This improves the adhesion durability between the stabilizer bar 2 and the stabilizer bush 1.

Further, the inside diameter R2 in the second virtual plane 26 is set to be greater than the inside diameter R1 in the first virtual plane 23. Thus, as compared to the first and second elastic bodies 30, 40, the first and second portions 24, 25 on either side of the first virtual plane 23 are likely to be greatly compressed in the circumferential direction. As the lip 27 is provided only for the first and second elastic bodies 30, 40, which exhibit a relatively small amount of circumferential compression, the amount of circumferential compression on the lip 27 can be reduced. Consequently, the circumferential shear stress is unlikely to be applied to the adhesive layer 4 between the inner peripheral surface 27a of the lip 27 and the outer peripheral surface 2a of the stabilizer bar 2. This improves the adhesion durability between the stabilizer bar 2 and the stabilizer bush 1.

The difference between the inside diameter R1 and the inside diameter R2 is the same as the up-down dimension of the first or second portion 24, 25. Therefore, bonding the first and second elastic bodies 30, 40 along the stabilizer bar 2 increases the amount of circumferential compression on the first and second portions 24, 25 and decreases the amount of circumferential compression on the first and second elastic bodies 30, 40. As the lip 27 is provided only for the first and second elastic bodies 30, 40, the amount of circumferential compression on the lip 27 can be further reduced. Consequently, the circumferential shear stress is more unlikely to be applied to the adhesive layer 4 between the inner peripheral surface 27a of the lip 27 and the outer peripheral surface 2a of the stabilizer bar 2. This further improves the adhesion durability between the stabilizer bar 2 and the stabilizer bush 1.

Figure 8:
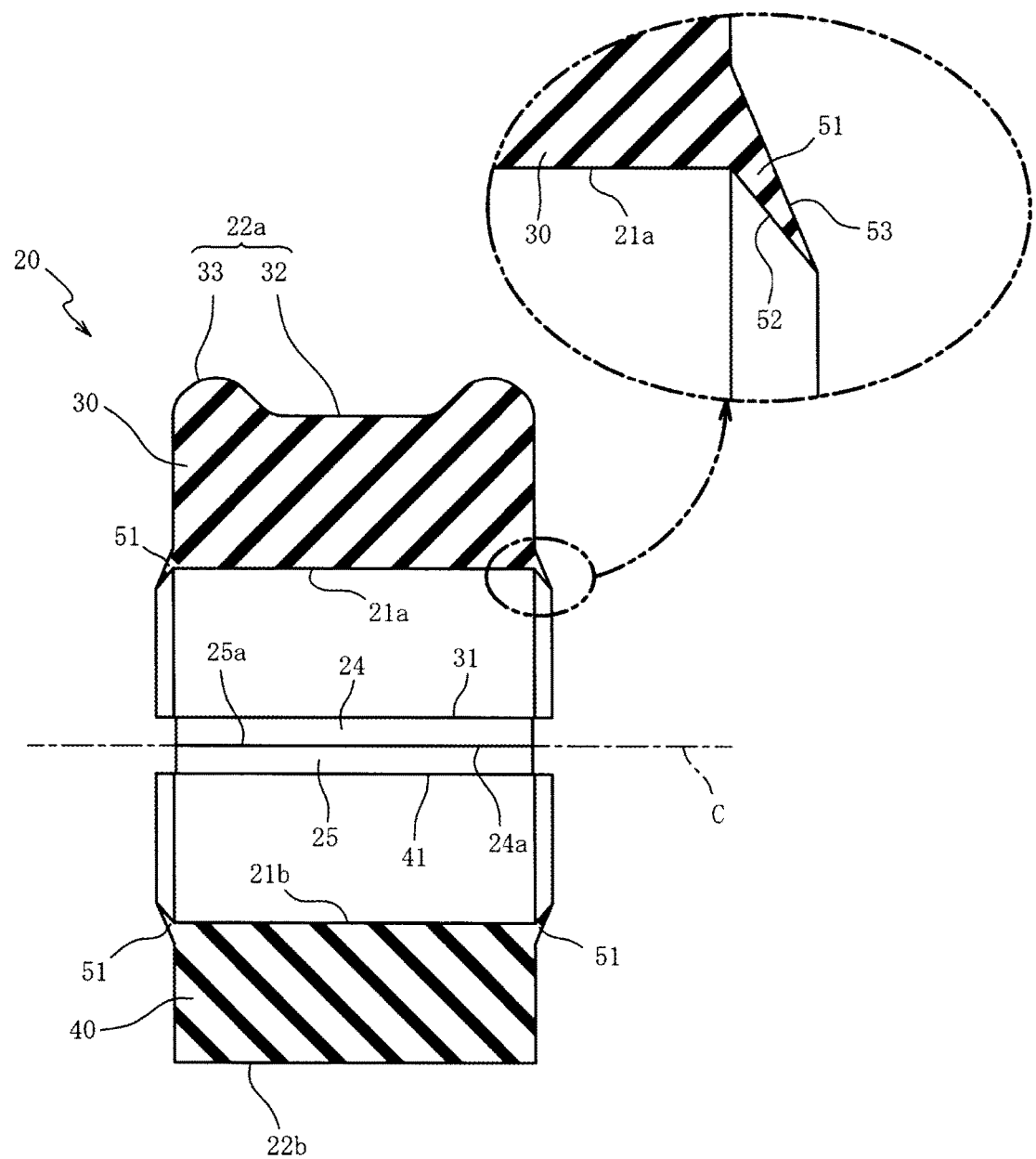
FIG. 8 is a cross-sectional view of the bush main body and its lip according to a second embodiment of the present invention.

A lip 51 of the stabilizer bush according to a second embodiment of the present invention will now be described with reference to FIG. 8. The first embodiment has been described on the assumption that the inner peripheral surface 27a of the lip 27 is formed in parallel with the axial center C. Meanwhile, the second embodiment will be described on the assumption that the inner peripheral surface (inner sloped portion 52) of the lip 51 is formed in parallel with the axial center C. Elements identical with those described in conjunction with the first embodiment are designated by the same reference numerals as their counterparts and will not be redundantly described. FIG. 8 is a cross-sectional view of the bush main body 20 and its lip 51 according to the second embodiment.

As shown in FIG. 8, the lip 51 is annular in shape and formed integrally with the bush main body 20. The lip 51 is axially projected from the side toward the axial center C of the axial end of the bush main body 20. The outer peripheral surface of the lip 51 includes an outer sloped portion 53 that is tilted with respect to the axial center C in the cross-section including the axial center C. The outer sloped portion 53 approaches the axial center C with an increase in the distance from the bush main body 20, and is contiguous to the axial end of the bush main body 20. The whole outer peripheral surface of the lip 51 is the outer sloped portion 53.

The inner peripheral surface of the lip 51 includes an inner sloped portion 52 that is tilted in a no-load state with respect to the axial center C in the cross-section including the axial center C. In a no-load state, the inner sloped portion 52 approaches the axial center C with an increase in the distance from the bush main body 20. The inner sloped portion 52 is contiguous to the inner peripheral surfaces 21*a*, 21*b* of the bush main body 20. The whole inner peripheral surface of the lip 51 is the inner sloped portion 52.

When the bush main body 20 and the lip 51 are bonded to the stabilizer bar 2 (see FIG. 7), the inner peripheral surfaces 21*a*, 21*b* of the bush main body 20 are aligned with the inner sloped portion 52 in the cross-section including the axial center. The lip 51 is then pre-compressed in the prying direction by the amount of projection of the inner sloped portion 52 from the inner peripheral surfaces 21*a*, 21*b* toward the axial center C. When the bush main body 20 is tensile-deformed in the prying direction due to the pre-compression of the lip 51, a tensile force is unlikely to be applied to the adhesive layer 4 (see FIG. 7) between the lip 51 and the stabilizer bar 2. Consequently, the adhesion between the lip 51 and the stabilizer bar 2 is unlikely to peel off. This improves the adhesion durability between the stabilizer bar 2 and the stabilizer bush having the lip 51.

Figure 9:
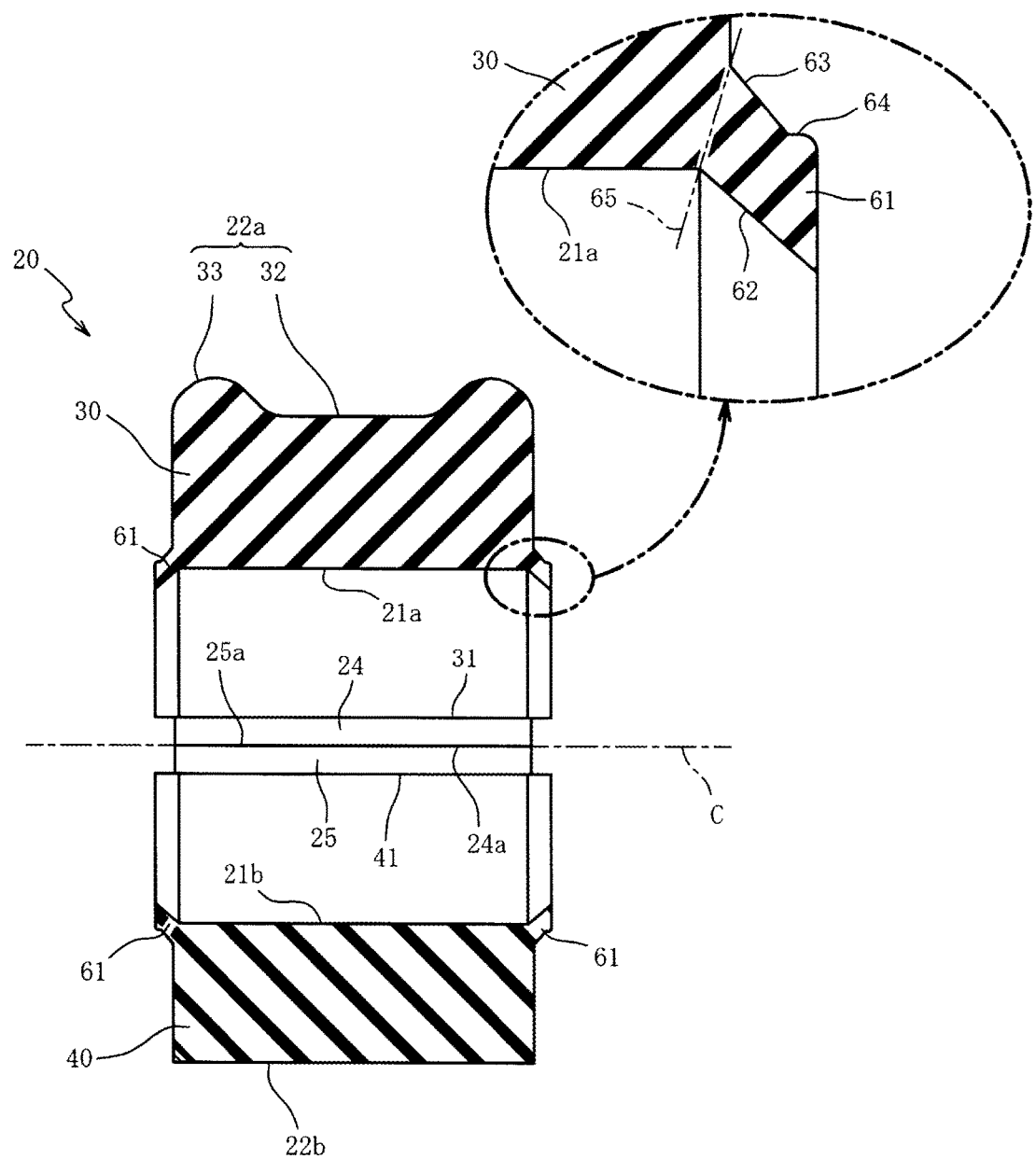
FIG. 9 is a cross-sectional view of the bush main body and its lip according to a third embodiment of the present invention.

A lip 61 of the stabilizer bush according to a third embodiment of the present invention will now be described with reference to FIG. 9. The first embodiment has been described on the assumption that the outer sloped portion 27*b*, which is the outer peripheral surface of the lip 27, is tilted toward the axial center C over the entire axial length. Meanwhile, the third embodiment will be described on the assumption that the outer peripheral surface of the lip 61 includes an outer parallel portion 64. The outer parallel portion 64 is formed in parallel with the axial center C. Elements identical with those described in conjunction with the first embodiment are designated by the same reference numerals as their counterparts and will not be redundantly described. FIG. 9 is a cross-sectional view of the bush main body 20 and its lip 61 according to the third embodiment.

As shown in FIG. 9, the lip 61 is annular in shape and formed integrally with the bush main body 20. The lip 61 is axially projected from the side toward the axial center C of the axial end of the bush main body 20. The inner peripheral surface of the lip 61 includes, in a no-load state, an inner sloped portion 62 that is tilted with respect to the axial center C in the cross-section including the axial center C. In a no-load state, the inner sloped portion 62 approaches the axial center C with an increase in the distance from the bush main body 20. The inner sloped portion 62 is contiguous to the inner peripheral surfaces 21*a*, 21*b* of the bush main body 20. The whole inner peripheral surface of the lip 61 is the inner sloped portion 62.

The start point of the inner sloped portion 62 is positioned axially inward from the axial end of the bush main body 20. In this instance, the lip 61 is a portion axially outward from a virtual line 65 that is obtained by connecting the start point of the outer peripheral surface (outer sloped portion 63) of the lip 61 to the start point of the inner sloped portion 62.

The start point of the inner sloped portion 62 is positioned axially inward from the axial end of the bush main body 20. This increases the amount of pre-compression that is oriented in the prying direction and exerted on the vicinity of the virtual line 65 (the vicinity of the base of the lip 61), which is the boundary between the lip 61 and the bush main body 20. Therefore, when the bush main body 20 bonded to the stabilizer bar 2 is tensile-defamed in the prying direction, the tensile stress is inhibited from concentrating on the vicinity of the base of the lip 61. This results in reducing the fatigue of the lip 61.

The outer peripheral surface of the lip 61 includes the outer sloped portion 63 and the outer parallel portion 64. The outer sloped portion 63 is tilted with respect to the axial center C in the cross-section including the axial center C. The outer parallel portion 64 is parallel to the axial center C. The outer sloped portion 63 approaches the axial center C with an increase in the distance from the bush main body 20. The outer sloped portion 63 is contiguous to the axial end of the bush main body 20. The outer parallel portion 64 is contiguous to the axial outer end of the outer sloped portion 63. The outer parallel portion 64 is extended to the axial leading end of the lip 61.

As the outer parallel portion 64 is disposed on the outer peripheral surface of the lip 61, the leading end of the lip 61 is adequately thick. This increases the strength of the lip 61. Further, a thick leading end of the lip 61 provides a greater amount of defamation than a thin leading end of the lip 61.

Consequently, when the bush main body 20 bonded to the stabilizer bar 2 is compressively deformed in the prying direction, the lip 61 absorbs a relatively large amount of axial expansion of the bush main body 20 in the vicinity of the stabilizer bar 2. Therefore, the tensile force is unlikely to be applied to the adhesive layer 4 (see FIG. 7) between the lip 61 and the stabilizer bar 2. Consequently, the adhesion between the lip 61 and the stabilizer bar 2 is unlikely to peel off. This improves the adhesion durability between the stabilizer bar 2 and the stabilizer bush having the lip 61.

Figure 10:
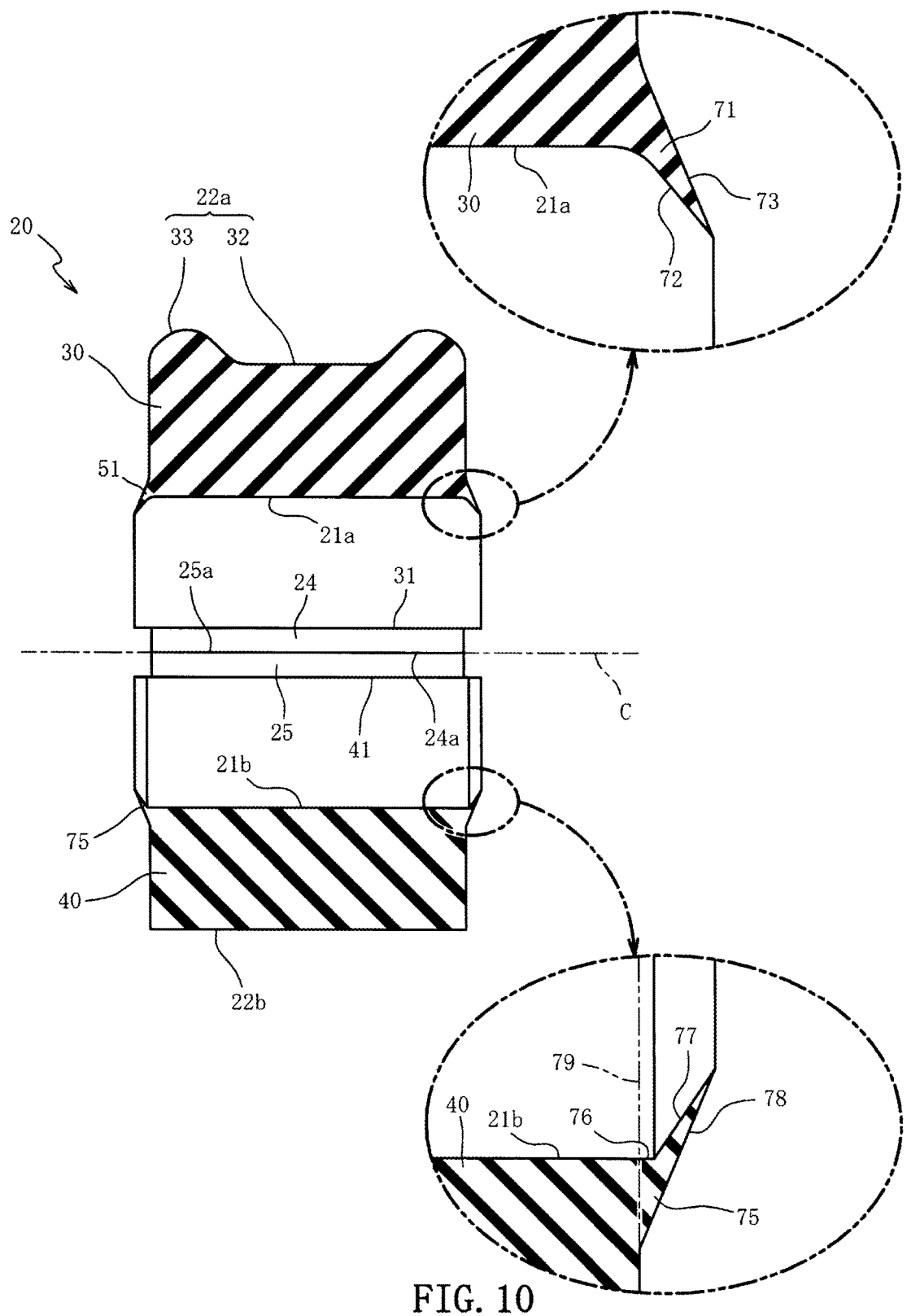
FIG. 10 is a cross-sectional view of the bush main body and its lips according to a fourth embodiment of the present invention.

Lips 71, 75 of the stabilizer bush according to a fourth embodiment of the present invention will now be described with reference to FIG. 10. The first embodiment has been described on the assumption that the lip 27 provided for the first elastic body 30 has the same shape as the lip 27 provided for the second elastic body 40. Meanwhile, the fourth embodiment will be described on the assumption that the lip 71 provided for the first elastic body 30 is different in shape from the lip 75 provided for the second elastic body 40. Elements identical with those described in conjunction with the first embodiment are designated by the same reference numerals as their counterparts and will not be redundantly described. FIG. 10 is a cross-sectional view of the bush main body 20 and its lips 71, 75 according to the fourth embodiment.

As shown in FIG. 10, the bush main body 20 includes the lips 71, 75. The lip 71 is formed integrally with the first elastic body 30. The lip 75 is famed integrally with the second elastic body 40. The lip 71 is annular in shape. The lip 71 is axially projected from the side toward the axial center C of the axial end of the first elastic body 30. The lip 75 is annular in shape and axially projected from the side toward the axial center C of the axial end of the second elastic body 40.

The inner peripheral surface of the lip 71 includes an inner sloped portion 72. The inner sloped portion 72 is tilted in a no-load state with respect to the axial center C in the cross-section including the axial center C, and approaches the axial center C with an increase in the distance from the bush main body 20. The whole inner peripheral surface of the lip 71 is the inner sloped portion 72. The inner sloped portion 72 is contiguous to the inner peripheral surfaces 21*a*, 21*b* of the bush main body 20 in a smoothly curved manner.

The outer peripheral surface of the lip 71 includes an outer sloped portion 73. The outer sloped portion 73 is tilted with respect to the axial center C in the cross-section including the axial center C, and approaches the axial center C with an increase in the distance from the bush main body 20. The whole outer peripheral surface of the lip 71 is the outer sloped portion 73. The outer sloped portion 73 is contiguous to the axial end of the bush main body 20 in a smoothly curved manner.

In the second embodiment, the inner peripheral surface 21a of the bush main body 20 and the inner sloped portion 52 of the lip 51 are contiguous to each other in a bent manner, and the axial end of the bush main body 20 and the outer sloped portion 53 of the lip 51 are contiguous to each other in a bent manner. When the lip 51 deforms in such an instance, stress concentrates on a bent portion, that is, the base of the lip 51. Therefore, the lip 51 may be likely to fatigue.

Meanwhile, in the fourth embodiment, the inner and outer sloped portions 72, 73 of the lip 71 are contiguous to the bush main body 20 in a smoothly curved manner. Therefore, stress is unlikely to concentrate on the base of the lip 71. This results in reducing the fatigue of the lip 71.

Further, the inner peripheral surface 21a of the bush main body 20 and the inner sloped portion 72 of the lip 71 are contiguous to each other in a smoothly curved manner. That is to say, the curved shape is concaved. Therefore, when the lip 71 is bonded to the stabilizer bar 2, the force pressing the lip 71 toward the axial center C gradually increases with a decrease in the distance to the leading end of the lip 71. Consequently, the leading end of the lip 71 is unlikely to turn over.

The outer peripheral surface of the lip 75 includes an outer sloped portion 78. The outer sloped portion 78 is tilted with respect to the axial center C in the cross-section including the axial center C, and approaches the axial center C with an increase in the distance from the bush main body 20. The whole outer peripheral surface of the lip 75 is the outer sloped portion 78.

The inner peripheral surface of the lip 75 includes an inner parallel portion 76 and an inner sloped portion 77. The inner parallel portion 76 is parallel to the axial center C. The inner sloped portion 77 is tilted in a no-load state with respect to the axial center C in the cross-section including the axial center C. The inner sloped portion 77 approaches the axial center C with an increase in the distance from the bush main body 20.

The inner parallel portion 76 is flush with the inner peripheral surface 21b of the bush main body 20. The inner parallel portion 76 places the bush main body 20 in communication with the inner sloped portion 77. The lip 75 is a portion axially outward from a virtual plane 79 that is flush with the axial end of the bush main body 20.

The inner parallel portion 76 is disposed on the inner peripheral surface at the base of the lip 75. Therefore, when the lip 75 is to be bonded to the stabilizer bar 2, the amount of defamation of the base of the lip 75 is decreased. Accordingly, stress is unlikely to be applied to a bent portion joining the outer sloped portion 78 and the bush main body 20. This results in reducing the fatigue of the lip 75.

The first elastic body 30 and the second elastic body 40 are different in shape. Therefore, when the stabilizer bar 2 deforms in the prying direction, the first elastic body 30 and the second elastic body 40 differ in deformation style. As the lips 71, 75 provided for the first and second elastic bodies 30, 40 are formed into different shapes in accordance with the defamation style of each of the first and second elastic bodies 30, 40, the adhesion between the lips 71, 75, the bush main body 20, and the stabilizer bar 2 is more unlikely to peel off.

Figure 11:
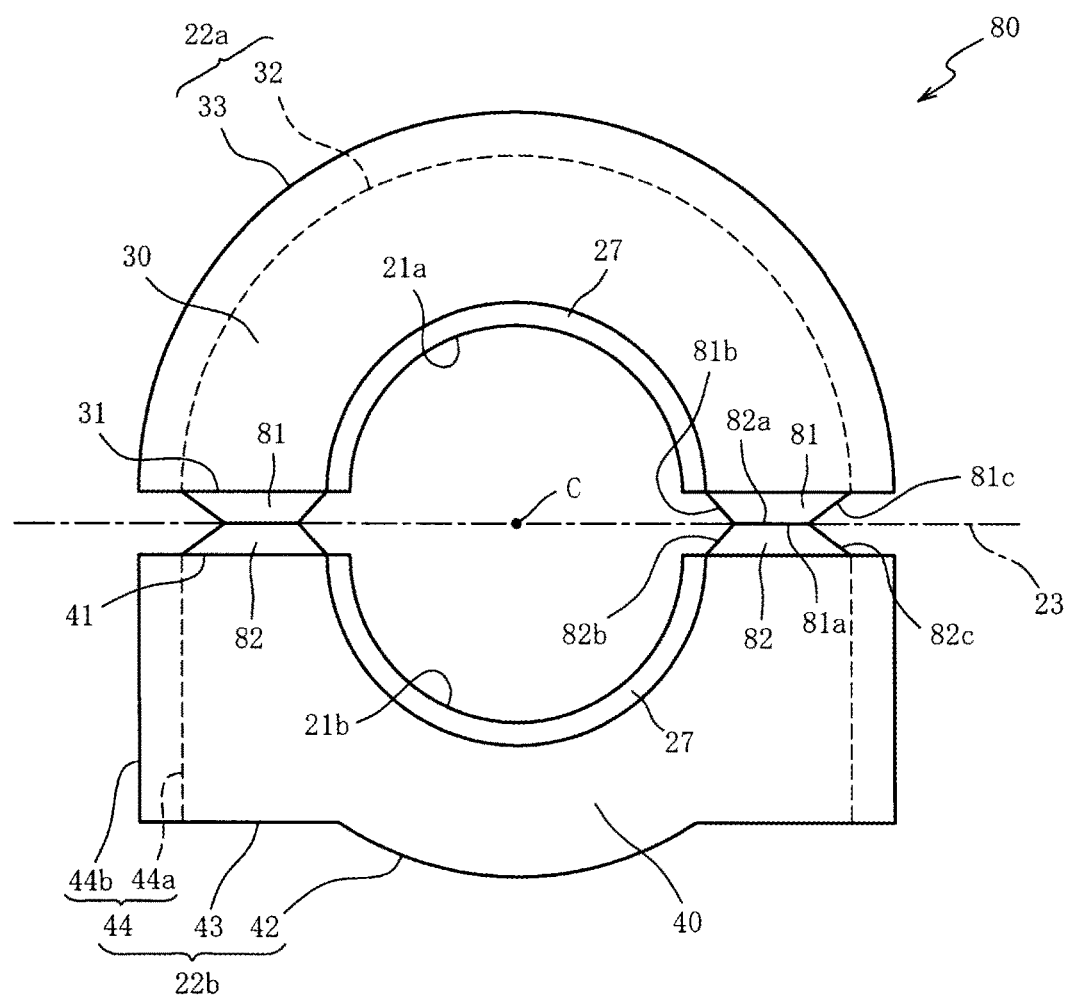
FIG. 11 is a front view of the bush main body according to a fifth embodiment of the present invention.

A bush main body 80 of the stabilizer bush according to a fifth embodiment of the present invention will now be described with reference to FIG. 11. The first embodiment has been described on the assumption that the inner surface portions 24b, 25b of the first and second portions 24, 25 are contiguous to the inner peripheral surfaces 21a, 21b of the first and second elastic bodies 30, 40 while the outer surface portions 24c, 25c are contiguous to the outer peripheral surfaces 22a, 22b. Meanwhile, the fifth embodiment will be described on the assumption that inner surface portions 81b, 82b and outer surface portions 81c, 82c of first and second portions 81, 82 are contiguous to the circumferential ends of the first and second elastic bodies 30, 40. Elements identical with those described in conjunction with the first embodiment are designated by the same reference numerals as their counterparts and will not be redundantly described. FIG. 11 is a front view of the bush main body 80 according to the fifth embodiment.

The first portion 81 of the bush main body 80 is extended from the first virtual plane 23 to the boundary 31. The first portion 81 is molded integrally with the first elastic body 30. The second portion 82 of the bush main body 80 is disposed opposite the first portion 81 with the first virtual plane 23 sandwiched in between, and is extended from the first virtual plane 23 to the boundary 41. The second portion 82 is molded integrally with the second elastic body 40. The first portion 81 and the second portion 82 are formed plane-symmetrically with respect to the first virtual plane 23. Therefore, the first portion 81 will be described below while omitting a part of the description of the second portion 82.

The lower surface of the first portion 81, which is positioned apart from the boundary 31, includes a leading end portion 81a, an inner surface portion 81b, and an outer surface portion 81c. The leading end portion 81a is at the leading end. The inner surface portion 81b is positioned radially inward from the leading end portion 81a. The outer surface portion 81c is positioned radially outward from the leading end portion 81a. The leading end portion 81a is planar in shape and is flush with the first virtual plane 23. While the first portion 81 and the second portion 82 are in contact with each other in a no-load state of the bush main body 80 before it is bonded to the stabilizer bar 2, the leading end portion 81a comes into contact with the leading end portion 82a of the second portion 82.

The inner surface portion 81b places the radially inner end of the leading end portion 81a in communication with the first elastic body 30. The inner surface portion 81b is tilted with respect to the first virtual plane 23. The inner surface portion 81b is contiguous to the axial end of the first elastic body 30 at a position radially outward from the lip 27.

In the first embodiment, the inner surface portion 24b of the first portion 24 is contiguous to the inner peripheral surface 21a of the first elastic body 30. Therefore, when the radially pre-compressed bush main body 20 is to be bonded to the stabilizer bar 2, the inner surface portion 24b readily comes into contact with the stabilizer bar 2. The lip 27 is not provided for the first portion 24. Consequently, when the bush main body 20 is compressively defamed in the prying direction, the inner surface portion 24b of a portion non-bonded to the stabilizer bar 2 may rub against the stabilizer bar 2 and wear off to generate worn dust.

Meanwhile, in the fifth embodiment, the inner surface portion 81b is not contiguous to the inner peripheral surface 21a. The inner surface portion 81b is contiguous to the axial end of the first elastic body 30 at a position radially outward from the lip 27 (with respect to the inner peripheral surface 21a). Therefore, even when the radially pre-compressed bush main body 80 is bonded to the stabilizer bar 2, the inner surface portion 81b is unlikely to come into contact with the stabilizer bar 2. This inhibits the inner surface portion 81b from rubbing against the stabilizer bar 2 and wearing off. As a result, worn dust is unlikely to be generated.

The outer surface portion 81c places the radially outer end of the leading end portion 81a in communication with the first elastic body 30. The outer surface portion 81c is tilted with respect to the first virtual plane 23. The outer surface portion 81c is not contiguous to the restricting portion 33, which is a part of the outer peripheral surface 22a of the first elastic body 30. The outer surface portion 81c is contiguous to the third curved surface 32 at a position radially inward from the restricting portion 33. That is to say, the outer surface portion 81c is contiguous to the axial end of the first elastic body 30. The outer surface portion 82c of the second portion 82 is not contiguous to the restricting portion 44b, which is a part of the outer peripheral surface 22b of the second elastic body 40, but is contiguous to the contact target portion 44a at a position radially inward from the restricting portion 44b.

In the first embodiment, the outer surface portion 24c of the first portion 24 is contiguous to the restricting portion 33 and to the third curved surface 32. Therefore, a portion contiguous to the third curved surface 32 of the first portion 24 needs to be concaved radially inward with respect to the restricting portion 33. Meanwhile, in the fifth embodiment, the outer surface portion 81c is not contiguous to the restricting portion 33, but is continuous to only the third curved surface 32. Consequently, no part of the first portion 81 needs to be concaved radially inward. As a result, the first portion 81 can be formed more easily than when a part of the first portion 81 is concaved radially inward.

While the present invention has been described in terms of embodiments, the present invention is not limited to the foregoing embodiments. It is to be readily understood that various improvements and modifications can be made without departing from the spirit and scope of the present invention. For example, the shapes, for instance, of the first elastic body 30, second elastic body 40, first portion 24, 81, second portion 25, 82, and lip 27, 51, 61, 71, 75 are merely illustrative and not restrictive. Obviously, various other shapes may be employed.

While the foregoing embodiments have been described on the assumption that the first virtual plane 23 vertically divides the bush main body 20, 80 into two at two circumferential points, the present invention is not limited to such a configuration. It is obvious that the first virtual plane 23 may alternatively divide the bush main body at only one circumferential point. As described earlier, a divided portion of the bush main body is likely to serve as a start point at which the adhesion between the bush main body and the stabilizer bar 2 peels off. A decrease in the number of divided portions of the bush main body improves the adhesion durability between the stabilizer bush and the stabilizer bar 2.

While the foregoing embodiments have been described on the assumption that the first virtual plane 23 includes the axial center C, the present invention is not limited to such a configuration. The first virtual plane 23 may alternatively be disposed at a position that does not include the axial center C. In such an alternative configuration, the inside diameter R1 is the distance from a point of intersection between the first virtual plane 23 and the second virtual plane 26 to the inner peripheral surface (inner peripheral surface 21a, 21b or virtual inner peripheral surface 21c) of the bush main body 20, 80. When the first virtual plane 23 includes the axial center C, the inner peripheral surface 21a of the first elastic body 30 and the inner peripheral surface 21b of the second elastic body 40 can be both famed in a semicircular shape. When such an alternative scheme is employed, the first elastic body 30 and the second elastic body 40 can easily be mounted on the stabilizer bar 2.

The foregoing embodiments have been described on the assumption that the first portion 24, 81 and the second portion 25, 82 are famed plane-symmetrically with respect to the first virtual plane 23 while the first portion 24, 81 and the second portion 25, 82 are in contact with each other in a no-load state of the bush main body 20, 80 before it is bonded to the stabilizer bar 2. However, the present invention is not limited to such a configuration. Obviously, the first portion 24, 81 and the second portion 25, 82 may alternatively be famed asymmetrically with respect to the first virtual plane 23. For example, the first portion 24 according to the first embodiment and the second portion 82 according to the fifth embodiment may be provided for a single bush main body.

The foregoing embodiments have been described on the assumption that the first portion 24, 81 and the second portion 25, 82 include the inner surface portions 24b, 25b, 81b, 82b and the outer surface portions 24c, 25c, 81c, 82c, respectively. However, the present invention is not limited to such a configuration. The inner surface portions 24b, 25b, 81b, 82b may be omitted by forming the radial inner ends of the first and second portions along the virtual inner peripheral surface 21c, which connects the inner peripheral surface 21a of the first elastic body 30 to the inner peripheral surface 21b of the second elastic body 40. Further, the outer surface portions 24c, 25c, 81c, 82c may be omitted by forming the radial outer ends of the first and second portions along a virtual outer peripheral surface that connects the outer peripheral surface 22a of the first elastic body 30 to the outer peripheral surface 22b of the second elastic body 40.

The first embodiment has been described on the assumption that the concave portions 24d, 25d and the convex portions 24e, 25e are tilted at substantially the same angle with respect to the first virtual plane 23. However, the present invention is not limited to such a configuration. The angle at which the concave portions 24d, 25d are tilted with respect to the first virtual plane 23 may alternatively be different from the angle at which the convex portions 24e, 25e are tilted with respect to the first virtual plane 23. Further, the concave portions 24d, 25d may be famed perpendicularly to the first virtual plane 23. However, when the concave portions 24d, 25d are tilted with respect to the first virtual plane 23, the first and second portions 24, 25 can be easily defamed radially outward. This results in increasing the amount of radial pre-compression on the vicinity of the first virtual plane 23 of the bush main body 20. Moreover, when the angle at which the concave portions 24d, 25d are tilted is substantially the same as the angle at which the convex portions 24e, 25e are tilted, the amount of radial pre-compression on the vicinity of the first virtual plane 23 of the bush main body 20 can be substantially uniform in the axial direction. This results in reducing the variation in the amount of radial pre-compression on the vicinity of the first virtual plane 23 of the bush main body 20.

The third embodiment has been described on the assumption that the outer peripheral surface of the lip 61 includes the outer parallel portion 64, which is parallel to the axial center C. However, the present invention is not limited to such a configuration. Obviously, the outer peripheral surface of the lip may be famed in parallel with the axial center C over the entire axial length.

The invention claimed is:
1. A stabilizer bush, comprising:
a bush main body that is formed of a cylindrical rubber elastic body, an inner peripheral surface of the bush main body being bonded to an outer peripheral surface of a stabilizer bar while the bush main body is radially pre-compressed, wherein the bush main body having a circumferential part divided by a first virtual plane includes:

a first portion that is extended over a predetermined circumferential distance from the first virtual plane;

a second portion that is disposed opposite the first portion with the first virtual plane sandwiched in between and is extended over a predetermined circumferential distance from the first virtual plane; and a third portion that is a portion other than the first and second portions, wherein an inside diameter of the inner peripheral surface in a second virtual plane that includes an axial center and is perpendicular to the first virtual plane is set to be greater than an inside diameter of the inner peripheral surface in the first virtual plane while the first portion is in contact with the second portion in a no-load state before bonding to the stabilizer bar, wherein the first portion includes a leading end portion, an inner surface portion that places the third portion in communication with a radial inside of the leading end portion and is tilted with respect to the first virtual plane, and an outer surface portion that places the third portion in communication with a radial outside of the leading end portion and is tilted with respect to the first virtual plane, and the leading end portion comes into contact with the second portion when the first portion and the second portion are in contact with each other in a no-load state of the bush main body that is still not bonded to the stabilizer bar, and wherein a radial center of the leading end portion is positioned radially inward from a radial center of a boundary between the first portion and the third portion.

2. The stabilizer bush according to claim 1, wherein the outer surface portion is contiguous to an outer peripheral surface of the third portion.

3. The stabilizer bush according to claim 1, wherein the inner surface portion is contiguous to an inner peripheral surface of the third portion.

4. The stabilizer bush according to claim 1, wherein the inner surface portion is contiguous to the third portion at a position radially outside of an inner peripheral surface of the third portion.

5. The stabilizer bush according to claim 1, wherein at least one of the inner and outer surface portions is formed in a planar shape.

6. The stabilizer bush according to claim 1, wherein the first and second portions are formed plane-symmetrically with respect to the first virtual plane while the first and second portions are in contact with each other in the no-load state of the bush main body before bonding to the stabilizer bar.

7. The stabilizer bush according to claim 1, wherein an inside diameter difference between the inner peripheral surface in the first virtual plane and the inner peripheral surface in the second virtual plane is the substantially same as a first or second portion dimension parallel to the second virtual plane while the first and second portions are in contact with each other in the no-load state before bonding to the stabilizer bar.

8. The stabilizer bush according to claim 1, wherein an inside diameter difference between the inner peripheral surface in the first virtual plane and the inner peripheral surface in the second virtual plane is set to be 0.1 to 0.2 times the inside diameter of the inner peripheral surface in the second virtual plane while the first and second portions are in contact with each other in the no-load state before bonding to the stabilizer bar.

9. A stabilizer bush, comprising:

a bush main body that is formed of a cylindrical rubber elastic body, an inner peripheral surface of the bush main body being bonded to an outer peripheral surface of a stabilizer bar while the bush main body is radially pre-compressed, wherein the bush main body having a circumferential part divided by a first virtual plane includes:

a first portion that is extended over a predetermined circumferential distance from the first virtual plane;

a second portion that is disposed opposite the first portion with the first virtual plane sandwiched in between and is extended over a predetermined circumferential distance from the first virtual plane; and a third portion that is a portion other than the first and second portions, wherein an inside diameter of the inner peripheral surface in a second virtual plane that includes an axial center and is perpendicular to the first virtual plane is set to be greater than an inside diameter of the inner peripheral surface in the first virtual plane while the first portion is in contact with the second portion in a no-load state before bonding to the stabilizer bar, wherein the first portion includes a leading end portion, an inner surface portion that places the third portion in communication with a radial inside of the leading end portion and is tilted with respect to the first virtual plane, and an outer surface portion that places the third portion in communication with a radial outside of the leading end portion and is tilted with respect to the first virtual plane, and the leading end portion comes into contact with the second portion when the first portion and the second portion are in contact with each other in a no-load state of the bush main body that is still not bonded to the stabilizer bar, and wherein a radial dimension of the outer surface portion is set to be greater than a radial dimension of the inner surface portion.

10. A stabilizer bush, comprising:

a bush main body that is formed of a cylindrical rubber elastic body, an inner peripheral surface of the bush main body being bonded to an outer peripheral surface of a stabilizer bar while the bush main body is radially pre-compressed, wherein the bush main body having a circumferential part divided by a first virtual plane includes:

a first portion that is extended over a predetermined circumferential distance from the first virtual plane;

a second portion that is disposed opposite the first portion with the first virtual plane sandwiched in between and is extended over a predetermined circumferential distance from the first virtual plane; and a third portion that is a portion other than the first and second portions, wherein an inside diameter of the inner peripheral surface in a second virtual plane that includes an axial center and is perpendicular to the first virtual plane is set to be greater than an inside diameter of the inner peripheral surface in the first virtual plane while the first portion is in contact with the second portion in a no-load state before bonding to the stabilizer bar, wherein the first portion includes a leading end portion, an inner surface portion that places the third portion in communication with a radial inside of the leading end portion and is tilted with respect to the first virtual plane, and an outer surface portion that places the third portion in communication with a radial outside of the leading end portion and is tilted with respect to the first virtual plane, and the leading end portion comes into contact with the second portion when the first portion and the second portion are in contact with each other in a no-load state of the bush main body that is still not bonded to the stabilizer bar, wherein the outer surface portion is contiguous to an outer peripheral surface of the third portion, and wherein the outer peripheral surface of the third portion includes a contact target portion that is disposed at the axial center, and a restricting portion that is disposed on each axial end of the contact target portion and projected radially outward with respect to the contact target portion, and the outer surface portion is contiguous to the contact target portion at a position radially inward from the restricting portion.

11. The stabilizer bush according to claim 10, wherein the outer surface portion is contiguous to the contact target portion and to the restricting portion.

* * * * *